US011470187B2

(12) United States Patent
Newman, Jr. et al.

(10) Patent No.: US 11,470,187 B2
(45) Date of Patent: Oct. 11, 2022

(54) MULTIPLE NETWORK ACCESS LOAD CONTROL DEVICES

(71) Applicant: Lutron Technology Company LLC, Coopersburg, PA (US)

(72) Inventors: Robert C. Newman, Jr., Emmaus, PA (US); Lawrence R. Carmen, Jr., Bath, PA (US); John H. Bull, Coplay, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 577 days.

(21) Appl. No.: 15/912,021

(22) Filed: Mar. 5, 2018

(65) Prior Publication Data

US 2018/0198893 A1 Jul. 12, 2018
US 2022/0286533 A9 Sep. 8, 2022

Related U.S. Application Data

(63) Continuation of application No. 13/835,291, filed on Mar. 15, 2013, now Pat. No. 10,244,086.
(Continued)

(51) Int. Cl.
*H04L 29/06* (2006.01)
*H04L 12/66* (2006.01)
(Continued)

(52) U.S. Cl.
CPC .......... *H04L 69/18* (2013.01); *H04L 12/2803* (2013.01); *H04L 12/2818* (2013.01); *H04L 12/2836* (2013.01); *H04L 12/66* (2013.01)

(58) Field of Classification Search
None
See application file for complete search history.

(56) References Cited

U.S. PATENT DOCUMENTS 4,864,588 A 9/1989 Simpson et al.
4,932,037 A 6/1990 Simpson et al.
(Continued)

FOREIGN PATENT DOCUMENTS

CA 2892464 A1 11/2015
CN 101789978 A 7/2010
(Continued)

OTHER PUBLICATIONS

U.S. Appl. No. 16/715,507, filed Dec. 16, 2019.
(Continued)

*Primary Examiner* — Rexford N Barnie
*Assistant Examiner* — Terrence R Willoughby
(74) *Attorney, Agent, or Firm* — Michael Czarnecki; Philip Smith; Glen Farbanish

(57) ABSTRACT

An apparatus for controlling the power delivered from an AC power source to an electrical load may include a controllably conductive device. The apparatus may also include a first wireless communication circuit that may be operable to communicate on a first wireless communication network via a first protocol and the first communication circuit may be in communication with the controller. The apparatus may also include a second communication circuit that may be operable to communicate on a second communication network via a second protocol. The controller may be further operable to control the first wireless communication circuit to communicate configuration data with the first wireless communication network via the first protocol. The controller may also be operable to control the second wireless communication circuit to communicate operational data with the second communication network via the second protocol.

19 Claims, 12 Drawing Sheets

Related U.S. Application Data

(60) Provisional application No. 61/745,441, filed on Dec. 21, 2012.

(51) Int. Cl.
*H04L 12/28* (2006.01)
*H04L 69/18* (2022.01)

(56) References Cited

U.S. PATENT DOCUMENTS

| | | | |
|---|---|---|---|
| 4,995,053 A | 2/1991 | Simpson et al. | |
| 5,239,205 A | 8/1993 | Hoffman et al. | |
| 5,340,954 A | 8/1994 | Hoffman et al. | |
| 5,454,077 A | 9/1995 | Eric | |
| 5,488,571 A | 1/1996 | Jacobs et al. | |
| 5,519,704 A | 5/1996 | Farinacci et al. | |
| 5,627,863 A | 5/1997 | Aslanis et al. | |
| 5,637,930 A | 6/1997 | Rowen et al. | |
| 5,637,964 A | 6/1997 | Hakkarainen et al. | |
| 5,736,965 A | 4/1998 | Mosebrook et al. | |
| 5,812,819 A | 9/1998 | Rodwin et al. | |
| 5,818,128 A | 10/1998 | Hoffman et al. | |
| 5,838,226 A | 11/1998 | Houggy et al. | |
| 5,848,054 A | 12/1998 | Mosebrook et al. | |
| 5,905,442 A | 5/1999 | Mosebrook et al. | |
| 5,982,103 A | 11/1999 | Mosebrook et al. | |
| 6,167,464 A | 12/2000 | Kretschmann | |
| 6,169,377 B1 | 1/2001 | Byrde et al. | |
| 6,300,727 B1 | 10/2001 | Bryde et al. | |
| 6,324,089 B1 | 11/2001 | Symoen et al. | |
| 6,380,696 B1 | 4/2002 | Sembhi et al. | |
| 6,437,692 B1 | 8/2002 | Petite et al. | |
| 6,526,581 B1 | 2/2003 | Edson | |
| 6,545,434 B2 | 4/2003 | Sembhi et al. | |
| 6,687,487 B1 | 2/2004 | Mosebrook et al. | |
| 6,803,728 B2 | 10/2004 | Gnanagiri et al. | |
| 6,807,463 B1 | 10/2004 | Cunningham et al. | |
| 6,831,569 B2 | 12/2004 | Wang et al. | |
| 6,856,236 B2 | 2/2005 | Christensen et al. | |
| 6,859,644 B2 | 2/2005 | Ling | |
| 6,876,295 B1 | 4/2005 | Lewis | |
| 6,879,806 B2 | 4/2005 | Peter | |
| 6,891,838 B1 | 5/2005 | Petite et al. | |
| 6,903,650 B2 | 6/2005 | Murray | |
| 6,914,533 B2 | 7/2005 | Petite | |
| 6,914,893 B2 | 7/2005 | Petite | |
| 6,927,547 B2 | 8/2005 | Walko et al. | |
| 6,980,080 B2 | 12/2005 | Christensen et al. | |
| 7,035,270 B2 | 4/2006 | Moore, Jr. et al. | |
| 7,053,767 B2 | 5/2006 | Petite et al. | |
| 7,085,627 B2 | 8/2006 | Bamberger et al. | |
| 7,089,066 B2 | 8/2006 | Hesse et al. | |
| 7,102,502 B2 | 9/2006 | Autret | |
| 7,103,511 B2 | 9/2006 | Petite | |
| 7,106,261 B2 | 9/2006 | Nagel et al. | |
| 7,126,291 B2 | 10/2006 | Kruse et al. | |
| 7,211,968 B2 | 5/2007 | Adamson et al. | |
| 7,218,998 B1 | 5/2007 | Neale | |
| 7,219,141 B2 | 5/2007 | Bonasia et al. | |
| 7,307,542 B1 | 12/2007 | Chandler et al. | |
| 7,323,991 B1 * | 1/2008 | Eckert | G07C 9/28 340/572.1 |
| 7,345,270 B1 | 3/2008 | Jones et al. | |
| 7,346,016 B2 | 3/2008 | Nielsen et al. | |
| 7,358,927 B2 | 4/2008 | Luebke et al. | |
| 7,362,285 B2 | 4/2008 | Webb et al. | |
| 7,408,525 B2 | 8/2008 | Webb et al. | |
| 7,498,952 B2 | 3/2009 | Newman, Jr. | |
| 7,525,928 B2 | 4/2009 | Cutler | |
| 7,548,216 B2 | 6/2009 | Webb et al. | |
| 7,573,208 B2 | 8/2009 | Newman, Jr. | |
| 7,573,436 B2 | 8/2009 | Webb et al. | |
| 7,598,684 B2 | 10/2009 | Lys et al. | |
| 7,687,744 B2 | 3/2010 | Walter et al. | |
| 7,697,492 B2 | 4/2010 | Petite | |
| 7,714,790 B1 | 5/2010 | Feldstein et al. | |
| 7,755,505 B2 | 7/2010 | Johnson et al. | |
| 7,756,086 B2 | 7/2010 | Petite et al. | |
| 7,756,097 B2 * | 7/2010 | Uehara | H04W 92/18 370/342 |
| 7,756,556 B2 | 7/2010 | Patel et al. | |
| 7,805,134 B2 | 9/2010 | Mirza-Baig | |
| 7,821,160 B1 | 10/2010 | Roosli et al. | |
| 7,852,765 B2 | 12/2010 | Neuman et al. | |
| 7,853,221 B2 | 12/2010 | Rodriguez et al. | |
| 7,889,051 B1 | 2/2011 | Billig et al. | |
| 8,013,732 B2 | 9/2011 | Petite et al. | |
| 8,031,650 B2 | 10/2011 | Petite et al. | |
| 8,035,255 B2 | 10/2011 | Kurs et al. | |
| 8,146,074 B2 | 3/2012 | Ito et al. | |
| 8,173,920 B2 | 5/2012 | Altonen et al. | |
| 8,228,163 B2 | 7/2012 | Cash et al. | |
| 8,254,838 B2 | 8/2012 | Feldstein | |
| 8,339,247 B2 | 12/2012 | Adamson et al. | |
| 8,364,319 B2 | 1/2013 | Roosli | |
| 8,368,310 B1 | 2/2013 | Roosli | |
| 8,379,564 B2 | 2/2013 | Petite et al. | |
| 8,396,007 B2 | 3/2013 | Gonia et al. | |
| 8,416,074 B2 | 4/2013 | Sadwick | |
| 8,525,372 B2 | 9/2013 | Huang | |
| 8,548,607 B1 | 10/2013 | Belz et al. | |
| 8,598,978 B2 | 12/2013 | Knode | |
| 8,742,686 B2 | 6/2014 | Zampini, II et al. | |
| 8,792,401 B2 | 7/2014 | Banks et al. | |
| 8,892,261 B2 | 11/2014 | Hoonhout et al. | |
| 9,049,753 B1 | 6/2015 | Wassel et al. | |
| 9,066,381 B2 | 6/2015 | Valois et al. | |
| 9,253,857 B2 | 2/2016 | Van Der Werff | |
| 9,288,228 B2 | 3/2016 | Suumaki | |
| 9,368,025 B2 | 6/2016 | Carmen, Jr. | |
| 9,413,171 B2 | 8/2016 | Neyhart | |
| 9,445,482 B2 | 9/2016 | Brochu et al. | |
| 9,445,485 B2 | 9/2016 | Reed | |
| 9,548,797 B1 | 1/2017 | Green et al. | |
| 9,641,959 B2 | 5/2017 | Brochu et al. | |
| 9,766,645 B2 | 9/2017 | Imes et al. | |
| 9,767,249 B1 | 9/2017 | Belz et al. | |
| 10,019,047 B2 | 7/2018 | Bull | |
| 10,050,444 B2 | 8/2018 | Neyhart | |
| 10,135,629 B2 | 11/2018 | Browne, Jr. et al. | |
| 10,244,086 B2 | 3/2019 | Newman, Jr. et al. | |
| 10,271,407 B2 | 4/2019 | Pessina et al. | |
| 10,314,132 B1 | 6/2019 | Wilde | |
| 10,516,546 B2 | 12/2019 | Browne, Jr. et al. | |
| 10,587,147 B2 | 3/2020 | Carmen, Jr. | |
| 10,588,204 B2 | 3/2020 | Pessina et al. | |
| 10,693,558 B2 | 6/2020 | Economy | |
| 2001/0024164 A1 | 9/2001 | Kawamura et al. | |
| 2002/0010518 A1 | 1/2002 | Reid et al. | |
| 2002/0043938 A1 | 4/2002 | Lys | |
| 2002/0060530 A1 | 5/2002 | Sembhi et al. | |
| 2002/0073183 A1 | 6/2002 | Yoon et al. | |
| 2002/0087436 A1 | 7/2002 | Guthrie et al. | |
| 2002/0113909 A1 | 8/2002 | Sherwood | |
| 2002/0154025 A1 | 10/2002 | Ling | |
| 2003/0034898 A1 | 2/2003 | Shamoon et al. | |
| 2003/0040813 A1 | 2/2003 | Gonzales et al. | |
| 2003/0109270 A1 | 6/2003 | Shorty | |
| 2003/0151493 A1 | 8/2003 | Straumann et al. | |
| 2003/0197993 A1 | 10/2003 | Mirowski et al. | |
| 2004/0036624 A1 | 2/2004 | Ballew et al. | |
| 2004/0052076 A1 | 3/2004 | Mueller et al. | |
| 2004/0058706 A1 | 3/2004 | Williamson et al. | |
| 2004/0059840 A1 | 3/2004 | Perego et al. | |
| 2004/0193998 A1 | 9/2004 | Blackburn et al. | |
| 2004/0217718 A1 | 11/2004 | Kumar et al. | |
| 2005/0030153 A1 | 2/2005 | Mullet et al. | |
| 2005/0045429 A1 | 3/2005 | Baker | |
| 2005/0048944 A1 | 3/2005 | Wu | |
| 2005/0156708 A1 | 7/2005 | Puranik et al. | |
| 2005/0179558 A1 | 8/2005 | Williams et al. | |
| 2005/0253538 A1 | 11/2005 | Shah et al. | |
| 2005/0285547 A1 | 12/2005 | Piepgras et al. | |
| 2006/0027081 A1 | 2/2006 | Chang et al. | |

(56) References Cited

U.S. PATENT DOCUMENTS

| | | |
|---|---|---|
| 2006/0044152 A1 | 3/2006 | Wang |
| 2006/0109203 A1 | 5/2006 | Huber et al. |
| 2006/0154598 A1 | 7/2006 | Rudland et al. |
| 2006/0171332 A1 | 8/2006 | Barnum |
| 2006/0174102 A1 | 8/2006 | Smith et al. |
| 2006/0192697 A1 | 8/2006 | Quick et al. |
| 2006/0202851 A1 | 9/2006 | Cash et al. |
| 2006/0251059 A1 | 11/2006 | Otsu et al. |
| 2006/0256798 A1 | 11/2006 | Quick et al. |
| 2006/0273970 A1 | 12/2006 | Mosebrook et al. |
| 2006/0284734 A1 | 12/2006 | Newman, Jr. |
| 2006/0285150 A1 | 12/2006 | Jung et al. |
| 2007/0051529 A1 | 3/2007 | Soccoli et al. |
| 2007/0083294 A1 | 4/2007 | Bruno |
| 2007/0085699 A1 | 4/2007 | Walters et al. |
| 2007/0085700 A1 | 4/2007 | Walters et al. |
| 2007/0085701 A1 | 4/2007 | Walters et al. |
| 2007/0085702 A1 | 4/2007 | Walters et al. |
| 2007/0097993 A1 | 5/2007 | Bojahra et al. |
| 2007/0110192 A1 | 5/2007 | Steiner |
| 2007/0112939 A1 | 5/2007 | Wilson et al. |
| 2007/0121323 A1 | 5/2007 | Pawlik et al. |
| 2007/0165997 A1 | 7/2007 | Suzuki et al. |
| 2007/0176788 A1 | 8/2007 | Mor et al. |
| 2007/0229300 A1 | 10/2007 | Masato et al. |
| 2008/0055073 A1 | 3/2008 | Raneri et al. |
| 2008/0068126 A1 | 3/2008 | Johnson et al. |
| 2008/0068204 A1 | 3/2008 | Carmen et al. |
| 2008/0089266 A1 | 4/2008 | Orsat |
| 2008/0111491 A1 | 5/2008 | Spira |
| 2008/0136261 A1 | 6/2008 | Mierta |
| 2008/0136356 A1 | 6/2008 | Zampini et al. |
| 2008/0136663 A1 | 6/2008 | Courtney et al. |
| 2008/0147337 A1 | 6/2008 | Walters et al. |
| 2008/0148359 A1 | 6/2008 | Kezys et al. |
| 2008/0183316 A1 | 7/2008 | Clayton |
| 2008/0192767 A1 | 8/2008 | Howe et al. |
| 2008/0218099 A1 | 9/2008 | Newman |
| 2008/0258650 A1 | 10/2008 | Steiner et al. |
| 2008/0265799 A1 | 10/2008 | Sibert |
| 2008/0278297 A1 | 11/2008 | Steiner et al. |
| 2008/0284327 A1 | 11/2008 | Kang et al. |
| 2009/0026966 A1 | 1/2009 | Budde et al. |
| 2009/0079268 A1 | 3/2009 | Cook et al. |
| 2009/0085408 A1 | 4/2009 | Bruhn |
| 2009/0113229 A1 | 4/2009 | Cataldo et al. |
| 2009/0150004 A1 | 6/2009 | Wang et al. |
| 2009/0167484 A1 | 7/2009 | Burr |
| 2009/0206983 A1 | 8/2009 | Knode et al. |
| 2009/0251352 A1 | 10/2009 | Altonen et al. |
| 2009/0302782 A1 | 12/2009 | Smith |
| 2009/0315672 A1 | 12/2009 | Nantz et al. |
| 2009/0322251 A1 | 12/2009 | Hilgers |
| 2010/0012738 A1 | 1/2010 | Park |
| 2010/0031076 A1 | 2/2010 | Wan et al. |
| 2010/0052574 A1 | 3/2010 | Blakeley et al. |
| 2010/0052576 A1 | 3/2010 | Steiner et al. |
| 2010/0081375 A1 | 4/2010 | Rosenblatt et al. |
| 2010/0104255 A1 | 4/2010 | Yun et al. |
| 2010/0114242 A1 | 5/2010 | Doerr et al. |
| 2010/0127821 A1 | 5/2010 | Jones et al. |
| 2010/0134341 A1 | 6/2010 | Priest |
| 2010/0141153 A1 | 6/2010 | Recker et al. |
| 2010/0207532 A1 | 8/2010 | Mans |
| 2010/0207759 A1 | 8/2010 | Sloan et al. |
| 2010/0235008 A1 | 9/2010 | Forbes, Jr. et al. |
| 2010/0238001 A1 | 9/2010 | Veskovic |
| 2010/0238003 A1* | 9/2010 | Chan .............. G01D 4/004 340/538 |
| 2010/0244706 A1 | 9/2010 | Steiner et al. |
| 2010/0262296 A1 | 10/2010 | Davis et al. |
| 2010/0289430 A1 | 11/2010 | Stelzer et al. |
| 2010/0303099 A1 | 12/2010 | Rieken |
| 2011/0006908 A1 | 1/2011 | Frantz |
| 2011/0012738 A1 | 1/2011 | Nakamura et al. |
| 2011/0043163 A1 | 2/2011 | Baarman |
| 2011/0046792 A1 | 2/2011 | Imes et al. |
| 2011/0078411 A1 | 3/2011 | Maclinovsky et al. |
| 2011/0095622 A1 | 4/2011 | Feldstein et al. |
| 2011/0113475 A1 | 5/2011 | Garcia |
| 2011/0121654 A1 | 5/2011 | Recker et al. |
| 2011/0202910 A1 | 8/2011 | Venkatakrishnan et al. |
| 2011/0208369 A1 | 8/2011 | Yang et al. |
| 2011/0244798 A1 | 10/2011 | Daigle et al. |
| 2011/0244897 A1 | 10/2011 | Shibuya |
| 2011/0282468 A1 | 11/2011 | Ashdown |
| 2011/0282495 A1 | 11/2011 | Fischer et al. |
| 2011/0305200 A1 | 12/2011 | Schoofs et al. |
| 2012/0018578 A1 | 1/2012 | Polcuch |
| 2012/0038281 A1* | 2/2012 | Verfuerth ............. H05B 45/10 315/152 |
| 2012/0039400 A1 | 2/2012 | Rieken |
| 2012/0086561 A1* | 4/2012 | Ilyes ................ H05B 47/105 340/12.32 |
| 2012/0086562 A1 | 4/2012 | Steinberg |
| 2012/0091910 A1 | 4/2012 | Zhang et al. |
| 2012/0093039 A1 | 4/2012 | Rofougaran et al. |
| 2012/0094658 A1 | 4/2012 | Macias et al. |
| 2012/0108230 A1 | 5/2012 | Stepanian |
| 2012/0112654 A1* | 5/2012 | Choong .............. H05B 47/18 315/291 |
| 2012/0158203 A1 | 6/2012 | Feldstein |
| 2012/0163663 A1 | 6/2012 | Masoud et al. |
| 2012/0235504 A1 | 9/2012 | Kesler et al. |
| 2012/0235579 A1 | 9/2012 | Chemel et al. |
| 2012/0239963 A1 | 9/2012 | Smith |
| 2012/0250831 A1 | 10/2012 | Gorecki, Jr. |
| 2012/0254961 A1 | 10/2012 | Kim et al. |
| 2012/0257543 A1 | 10/2012 | Baum et al. |
| 2012/0274234 A1* | 11/2012 | Campbell ............. H05B 47/19 315/294 |
| 2012/0274670 A1 | 11/2012 | Lee et al. |
| 2012/0275391 A1 | 11/2012 | Cui et al. |
| 2012/0303768 A1 | 11/2012 | Fiennes |
| 2012/0306621 A1 | 12/2012 | Muthu |
| 2012/0315848 A1 | 12/2012 | Smith et al. |
| 2012/0322370 A1 | 12/2012 | Lee |
| 2012/0328302 A1 | 12/2012 | Iizuka et al. |
| 2013/0010018 A1 | 1/2013 | Economy |
| 2013/0014224 A1 | 1/2013 | Graves et al. |
| 2013/0026947 A1 | 1/2013 | Economy et al. |
| 2013/0030589 A1 | 1/2013 | Pessina et al. |
| 2013/0051375 A1 | 2/2013 | Chemishkian et al. |
| 2013/0063042 A1 | 3/2013 | Bora et al. |
| 2013/0073431 A1 | 3/2013 | Suro et al. |
| 2013/0100855 A1 | 4/2013 | Jung et al. |
| 2013/0134783 A1 | 5/2013 | Mohammediyan et al. |
| 2013/0187563 A1 | 7/2013 | Sasai et al. |
| 2013/0211844 A1 | 8/2013 | Sadwick |
| 2013/0223279 A1 | 8/2013 | Tinnakornsrisuphap et al. |
| 2013/0261821 A1 | 10/2013 | Lu et al. |
| 2013/0286889 A1 | 10/2013 | Cherian et al. |
| 2013/0322281 A1 | 12/2013 | Ludlow et al. |
| 2014/0070919 A1 | 3/2014 | Jackson et al. |
| 2014/0106735 A1 | 4/2014 | Jackson et al. |
| 2014/0163742 A1 | 6/2014 | Element |
| 2014/0163751 A1 | 6/2014 | Davis et al. |
| 2014/0175875 A1 | 6/2014 | Newman, Jr. et al. |
| 2014/0177469 A1 | 6/2014 | Neyhart |
| 2014/0180487 A1 | 6/2014 | Bull |
| 2014/0277805 A1 | 9/2014 | Browne, Jr. et al. |
| 2014/0289825 A1 | 9/2014 | Chan et al. |
| 2014/0304773 A1 | 10/2014 | Woods et al. |
| 2014/0375421 A1 | 12/2014 | Morrison et al. |
| 2014/0375428 A1 | 12/2014 | Park |
| 2015/0017973 A1 | 1/2015 | Gold |
| 2015/0097666 A1 | 4/2015 | Boyd et al. |
| 2015/0200925 A1 | 7/2015 | Lagerstedt et al. |
| 2015/0259078 A1 | 9/2015 | Filipovic et al. |
| 2015/0342011 A1 | 11/2015 | Brochu et al. |
| 2016/0119032 A1 | 4/2016 | Choi et al. |
| 2016/0148449 A1 | 5/2016 | God et al. |
| 2016/0149411 A1 | 5/2016 | Neyhart |
| 2016/0254699 A1 | 9/2016 | Carmen, Jr. |

(56) References Cited

U.S. PATENT DOCUMENTS

| | | |
|---|---|---|
| 2016/0285550 A1 | 9/2016 | Economy |
| 2017/0064798 A1 | 3/2017 | Economy et al. |
| 2017/0264452 A1 | 9/2017 | Vollmer et al. |
| 2018/0168019 A1 | 6/2018 | Baker et al. |
| 2018/0198893 A1 | 7/2018 | Newman, Jr. et al. |
| 2018/0205460 A1 | 7/2018 | Economy |
| 2018/0321722 A1 | 11/2018 | Bull |
| 2018/0324933 A1 | 11/2018 | Hammett et al. |
| 2019/0006846 A1 | 1/2019 | Neyhart |
| 2020/0092003 A1 | 3/2020 | Economy |
| 2020/0195460 A1 | 6/2020 | Browne, Jr. et al. |

FOREIGN PATENT DOCUMENTS

| | | |
|---|---|---|
| DE | 102006046489 A1 | 4/2008 |
| DE | 102009056152 A1 | 6/2011 |
| EP | 0767551 B1 | 8/2002 |
| EP | 1727399 A2 | 11/2006 |
| EP | 1693991 B1 | 7/2009 |
| GB | 2533675 A | 6/2016 |
| JP | 2011-023819 A | 2/2011 |
| WO | 1999046921 A2 | 9/1999 |
| WO | 2001052515 A1 | 7/2001 |
| WO | 2001074045 A1 | 10/2001 |
| WO | 2002071689 A2 | 9/2002 |
| WO | 2001052515 A9 | 10/2002 |
| WO | 2002071689 A3 | 11/2002 |
| WO | 2003007665 A1 | 1/2003 |
| WO | 2004023849 A1 | 3/2004 |
| WO | 2004056157 A1 | 7/2004 |
| WO | 2006133172 A2 | 12/2006 |
| WO | 2007069129 A2 | 6/2007 |
| WO | 2008040454 A2 | 4/2008 |
| WO | 2008092082 A2 | 7/2008 |
| WO | 2008095250 A1 | 8/2008 |
| WO | 2009010916 A2 | 1/2009 |
| WO | 2010027412 A1 | 3/2010 |
| WO | 2010143130 A1 | 12/2010 |
| WO | 2018099793 A1 | 6/2018 |

OTHER PUBLICATIONS

U.S. Appl. No. 16/813,148, filed Mar. 9, 2020.
U.S. Appl. No. 16/813,022, filed Mar. 9, 2020.
"CEDIA 2012: Crestron Demos Home Technology Control Solution with NFC-Enabled Mobile Device" Available at http://www.youtube.com/watch?v=qXwoTJX14BE retrieved on Aug. 13, 2013 Video Provided on CD Media Sep. 8, 2012 pp. 1-2.
"Crestron NFC Demo at CEDIA Expo 2012" Available at http://www.youtube.com/watch?v=FQ1f5vxwqnl Retrieved on Aug. 13, 2013 Transcript of Video provided on CD Media Sep. 10, 2012 pp. 1-2.
"SimpleLink™ CC3000 Boosterpack Jump-Starts the Internet of Things" Available at http://www.youtube.com/watch?v=6kh0g0KMIQc retrieved on Aug. 13, 2013 Transcript of Video provided on CD Media Jun. 6, 2013 1 page.
Black Rich "Clear Connect RF Technology" Lutron Electronics Company Inc. Aug. 2009 16 pages.
Gade Lisa "PalmOne Treo 600 Palm OS Smartphone from Sprint PCS" Oct. 28, 2013 Mobile Tech Review Document Available at: <http://www.mobiletechreview.com/treo_600.htm> Retrieved on May 21, 2013 4 Pages.
Gade Lisa "PalmOne Treo 650 Palm OS Smartphone: CDMA (Sprint) and GSM Versions" Dec. 10, 2004 Mobile Tech Review Document Available at: <http://web.archive.org/web/20050404004524/http://www.mobiletechreview.com/Treo_650.htm> Retrieved on May 21, 2013 6 Pages.
JSJSDesigns PLC "JS JS Products" Available at: <http://web.archive.org/web/20101111085355/http://www.jsjsdesigns.com/product.html> Nov. 11, 2010 4 pages.
Myers Dana "SimpleLink™ Wi-Fi® CC3000—First Time Config Using PC" Available at http://www.youtube.com/watch?v=10U4NTgkjLs retrieved on Aug. 13, 2013 Transcript of Video provided on CD Media Dec. 18, 2012 pp. 1-2.
Myers Dana "SimpleLink™ Wi-Fi® CC3000—First Time Config with Smartphone" Available at http://www.youtube.com/watch?v=fxP9hnZysgo Retrieved on Aug. 13, 2013 Transcript of Video provided on CD Media Sep. 19, 2012 pp. 1-2.
Rustybrick Inc. "iPhone 4 Morse Code Transmission App" Available at <http://www.rustybrick.com/iphone-morse-code.php> Jan. 4, 2011 3 pages.
Texas Instruments "CC3000 Smart Config" Available at http://processors.wiki.ti.com/index.php/CC3000_Smart_Config retrieved in Feb. 2, 2016 pp. 1-5.
U.S. Appl. No. 16/102,357, filed Aug. 13, 2018.
U.S. Appl. No. 16/030,310, filed Jul. 9, 2018.
U.S. Appl. No. 16/113,548, filed Aug. 27, 2018.
International Patent Application No. PCT/US2012/045067, International Search Report dated Oct. 29, 2012, 6 pages.
International Patent Application No. PCT/US2012/045114, International Search Report dated Oct. 24, 2012, 5 pages.
International Patent Application No. PCT/US2012/45096, International Search Report dated Apr. 2, 2013, 8 pages.

\* cited by examiner

MULTIPLE NETWORK ACCESS LOAD CONTROL DEVICES

CROSS-REFERENCE TO RELATED APPLICATIONS

This application is a continuation of U.S. patent application Ser. No. 13/835,291, filed Mar. 15, 2013, now U.S. Pat. No. 10,244,086, issued Mar. 26, 2019, which claims the benefit of commonly assigned U.S. Provisional Application No. 61/745,441, filed on Dec. 21, 2012, and titled "Multiple Network Access Load Control Devices", the entire contents of which are hereby incorporated by reference herein, for all purposes.

BACKGROUND

A load control device may control the amount of power delivered to an electrical load. Load control devices include, for example, lighting control devices (such as wall-mounted dimmer switches and plug-in lamp dimmers), motor control devices (for motor loads), temperature control devices, motorized window treatments, sensor devices, and remote controls. In FIG. 1, a typical residential environment may include lighting load controls 12, 16, 18. 20, 22, 26, 32, 34, and 38, motorized window treatments 20, 24, and 30, smart thermostats 28 and 36, and the like. The various load control devices, remote control devices, and/or sensor devices may communicate with the home Wi-Fi router 14.

The load control devices, sensors, and remote controllers may control the lights, smart thermostats, and/or the motorized window treatments in the typical residential (or commercial) environment. Typically, a load control device may be coupled in a series electrical connection between an alternating-current (AC) power source and the electrical load to control the power delivered from the AC power source to the electrical load.

Some load control devices are operable to transmit and receive wireless signals, such as radio-frequency (RF) or infrared (IR) signals, to thus provide for wireless control of the corresponding loads. One example of an RF lighting control system is disclosed in commonly-assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, the entire disclosure of which is hereby incorporated by reference.

As load control devices become more sophisticated and complex, they may benefit from more frequent reconfiguration and software updating. Such operations benefit from relatively high bandwidth wireless communications and are relatively agnostic to network latency. High bandwidth capable protocols (e.g. Wi-Fi) may be suitable for this kind of data. Examples of Wi-Fi-enabled load control devices include those described in commonly assigned U.S. application Ser. No. 13/538,555, filed Jun. 29, 2012, titled "LOAD CONTROL DEVICE HAVING INTERNET CONNECTIVITY"; in commonly assigned U.S. patent application Ser. No. 13/538,615, filed Jun. 29, 2012, titled "METHOD OF PROGRAMMING A LOAD CONTROL DEVICE USING A SMART PHONE"; and in commonly assigned U.S. patent application Ser. No. 13/538,665, filed on Jun. 29, 2012, titled "METHOD OF OPTICALLY TRANSMITTING DIGITAL INFORMATION FROM A SMART PHONE TO A CONTROL" DEVICE, the contents of each respective application being hereby incorporated by reference herein in their respective entirety, for all purposes.

By contrast, operational communications, such as on/off/dimming commands and sensor status, for load control devices benefit from high reliability and relatively low latency. These communications are generally short and generally would not benefit from higher bandwidth wireless technologies.

In light of these competing tradeoffs, a load control device would benefit from a communications system that provides bandwidth, reliability, and latency appropriate for both configuration and operational communications.

SUMMARY

An apparatus, such as a dimmer switch, may control the power delivered from an AC power source to an electrical load, like a light for example. The apparatus may include a controllably conductive device that may be coupled in a series electrical connection between the source and the load. A controller may be coupled to a control input of the controllably conductive device for rendering the controllably conductive device conductive and non-conductive. The apparatus may also include a first wireless communication circuit that may communicate on a first wireless communication network via a first protocol and the first wireless communication circuit may be in communication with the controller. The apparatus may also include a second communication circuit that may communicate on a second communication network via a second protocol. The second communication circuit may communicate with the controller. The controller may also control the first wireless communication circuit to communicate configuration data (e.g. firmware) with the first wireless communication network via the first protocol. The controller may also control the second wireless communication circuit to communicate operational data (e.g. command signals) with the second communication network via the second protocol.

An apparatus, such as an occupancy sensor or a remote controller, may be configured to provide information for the control of power delivered to at least one electrical load. The apparatus may comprise a controller and a sensor or a manual operator, such a button. The sensor or the manual operator may communicate with the controller. The apparatus may also include a first wireless communication circuit that may communicate on a first wireless communication network via a first protocol. The first wireless communication circuit may communicate with the controller. And the apparatus may also include a second communication circuit that may communicate on a second communication network via a second protocol. The second communication circuit may communicate with the controller. The controller may control the first wireless communication circuit to communicate configuration data (e.g. firmware data) with the first wireless communication network via the first protocol. The controller may also control the second wireless communication circuit to communicate operational data (e.g. control signals) with the second communication network via the second protocol.

A first apparatus for controlling the power delivered to at least a first electrical load may be in communication with one or more other apparatuses. Each of the one or more other apparatuses may respectively control the power delivered to one or more other electrical loads. The first apparatus may comprise a controllably conductive device and a controller. The controller may be in communication with the controllably conductive device. The first apparatus may include a first wireless communication circuit that may be operable to communicate on a first wireless communication network via a first protocol. The first communication circuit may be in communication with the controller. The first apparatus may also include a second communication circuit that may be operable to communicate on a second communication network via a second protocol. The second communication circuit may be in communication with the controller and the communication with the one or more other apparatuses may be conducted via the second communication network. The controller may be operable to receive via the second communication circuit and via the second protocol, a first signal from a second apparatus of the one or more other apparatuses. The first signal may indicate that the second apparatus of the one or more other apparatuses may be operable to respond to an operational command from the first apparatus.

One or more techniques may control power delivered from an AC power source to one or more electrical loads. The techniques may include configuring at least one condition, where the condition may include information obtained from at least one source via the Internet. The techniques may also include associating the at least one condition with one or more electrical loads, where the at least one condition may be associated with at least one adjustment of the one or more electrical loads. The techniques may also include determining one or more load control devices that are in operable communication with the one or more electrical loads and associating the at least one condition with the one or more load control devices. The techniques may include detecting an occurrence of the condition and directing the one or more load control devices to implement the at least one adjustment of the one or more electrical loads upon the occurrence of the condition.

BRIEF DESCRIPTION OF THE DRAWINGS

The contemplated devices and techniques will now be described in greater detail in the following detailed description with reference to the drawings in which.

DETAILED DESCRIPTION

Figure 1:
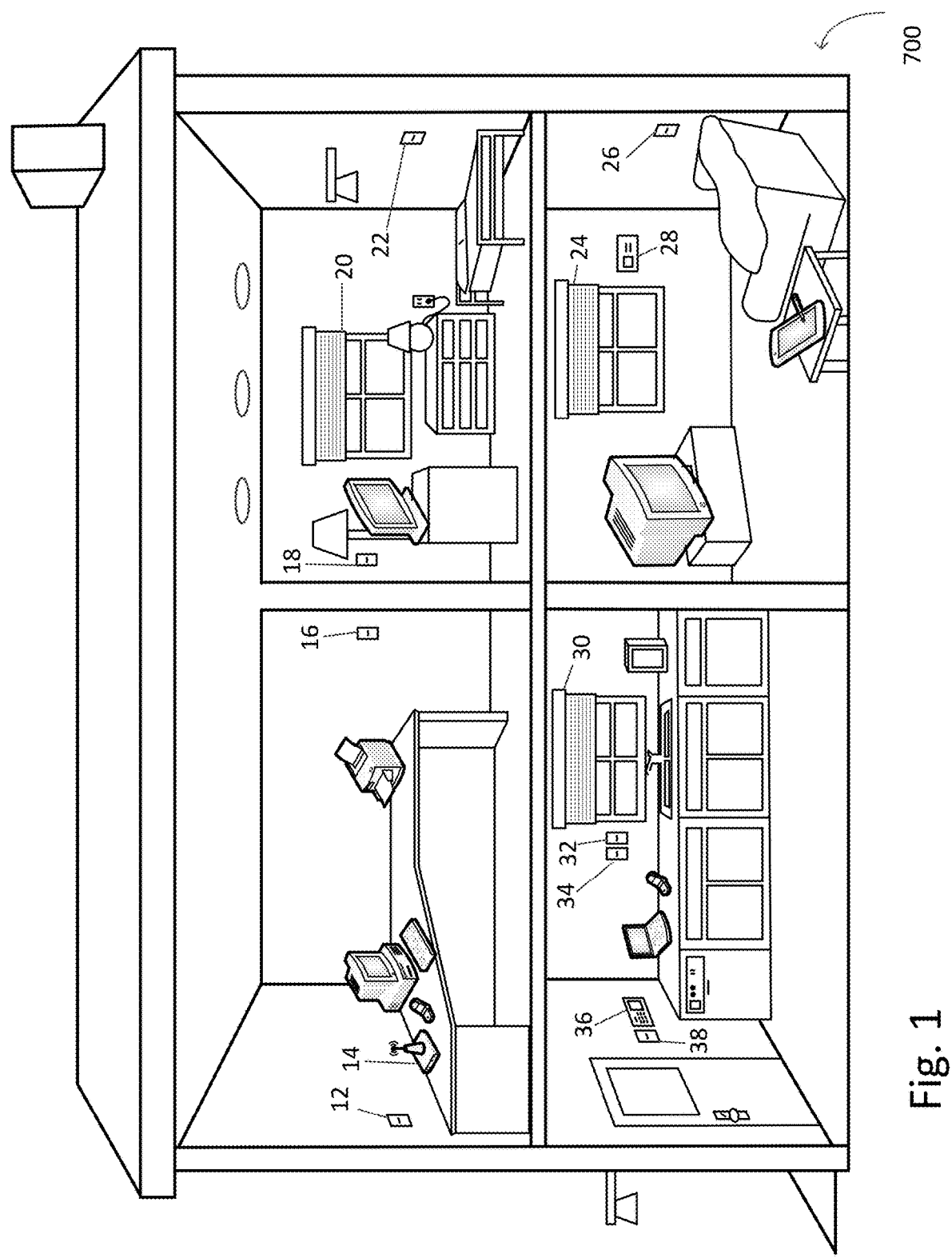
FIG. 1 is an exemplary environment that may utilize a number of load control devices.
Figure 2:
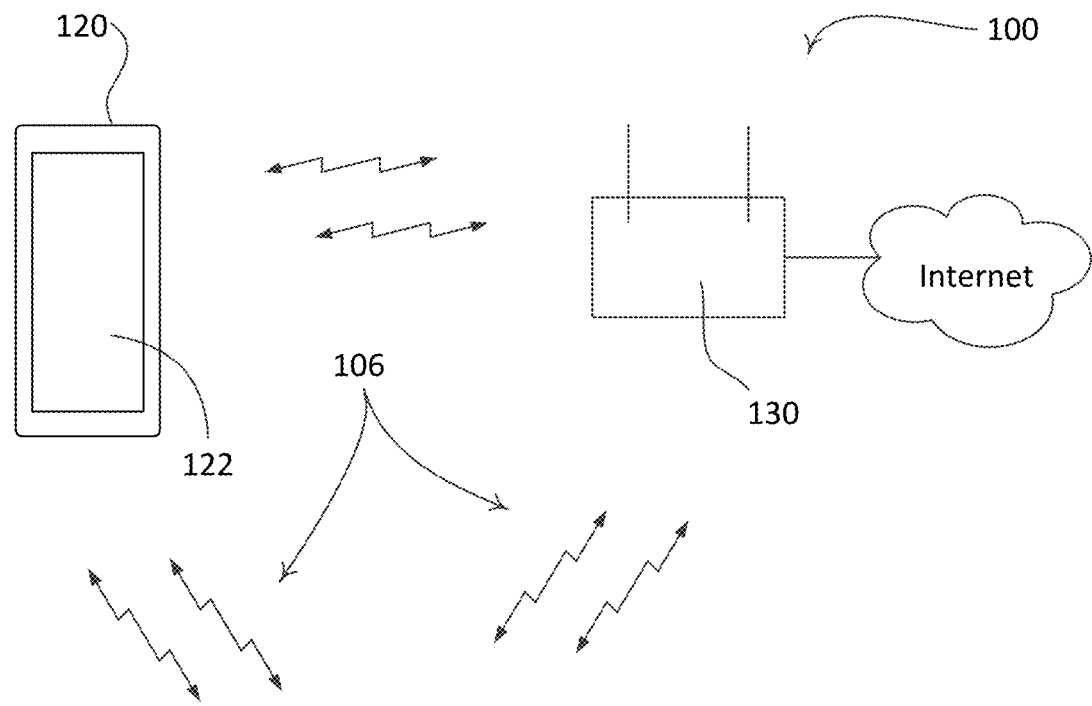
FIG. 2 is a simple diagram of a radio-frequency (RF) lighting control system comprising a dimmer switch and a wireless control device, such as a smart phone.
Figure 2:
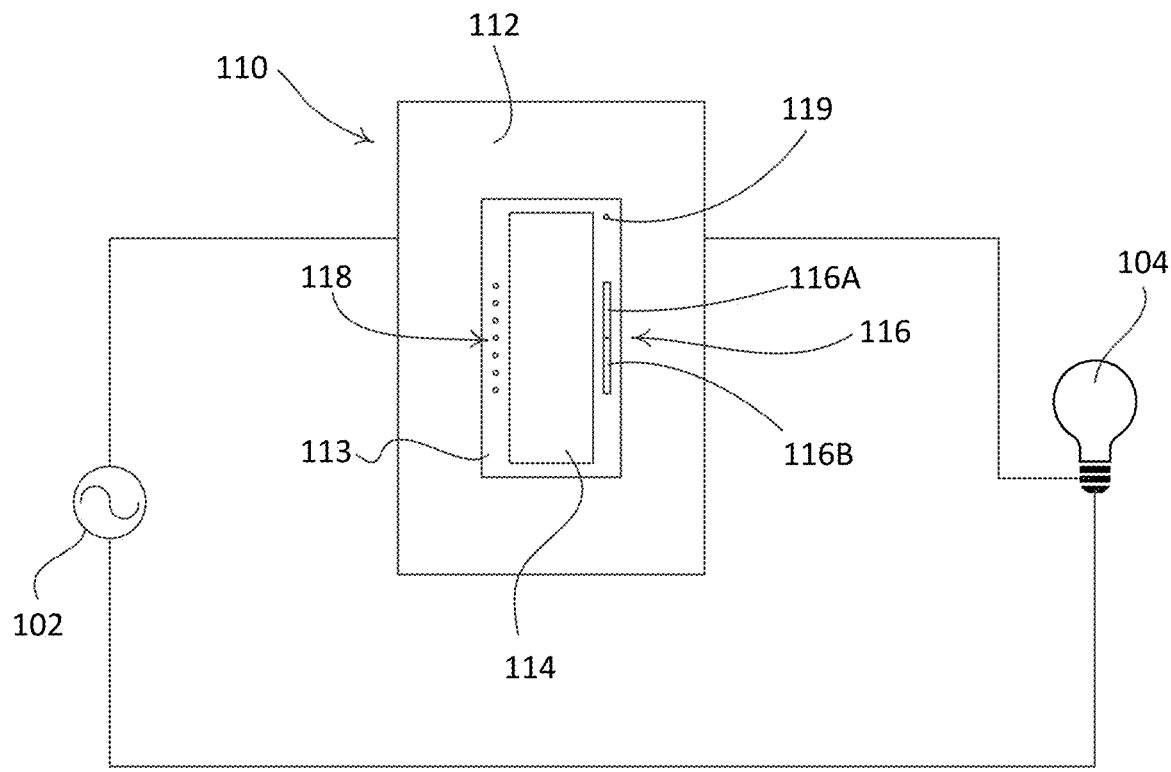

FIG. 2 is a simple diagram of a radio-frequency (RF) lighting control system 100 that includes a dimmer switch 110 and a wireless control device 120. The wireless control device 120 may be any device capable of performing wireless communications, such as, a smart phone (for example, an iPhone® smart phone, an Android® smart phone, or a Blackberry® smart phone), a personal computer, a laptop, a wireless-capable media device (e.g., MP3 player, gaming device, or television), or a tablet device, (for example, an iPad® hand-held computing device), a Wi-Fi or wireless-communication-capable television, or any other suitable Internet-Protocol-enabled device.

The wireless control device 120 may be operable to transmit digital messages in one or more Internet Protocol packets to the dimmer switch 110. The Internet Protocol (IP) is responsible for addressing hosts and routing datagrams (i.e., packets) from a source host to a destination host across one or more IP networks. For this purpose, the Internet Protocol defines an addressing system that has two functions: identifying hosts and providing a logical location service. This is accomplished by defining standard datagrams and a standard addressing system.

Each datagram has two components, a header and a payload. The IP header is tagged with the source IP address, destination IP address, and other meta-data needed to route and deliver the datagram. The payload is the data to be transported.

The wireless control device 120 may transmit the digital messages via RF signals 106 either directly or via a wireless network that includes a standard wireless router 130. For example, the wireless control device 120 may transmit the RF signals 106 directly to the dimmer switch 110 via a point-to-point communication, such as a Wi-Fi communication link, e.g., an 802.11 wireless local area network (LAN), or other direct wireless communication link, e.g., a Wi-MAX communication link or a Bluetooth® communication link. This point-to-point communication may be performed using a standardized communication, e.g., Wi-Fi Direct, or any non-standardized communication that allows a wireless device to connect to another wireless device without the use of a wireless access point. For example, the wireless control device 120 and/or the dimmer switch 110 may download a software access point (AP) that provides a protected wireless communication between the devices.

The wireless control device 120 may also transmit RF signals 106 to the dimmer switch 110 via a wireless network. The wireless network may enable wireless communications via one or more wireless communications links, such as a Wi-Fi communications link, a Wi-MAX communications link, a Bluetooth® communications link, a cellular communications link, a television white space (TVWS) communication link, or any combination thereof. For example, the wireless control device 120 may communicate with a network server via a first wireless communications link (e.g., a cellular communications link), while the dimmer switch 110 communicates with the network server via a second communications link (e.g., a Wi-Fi communications link). Alternatively or additionally, the wireless control device 120 and the dimmer switch 110 may communicate with the network via the same type of communication link. The lighting control system 100 may also include a femtocell, a Home Node B, and/or other network entity for facilitating the configuration and operation of the lighting control system and for allowing wireless communications and connection to the Internet.

The dimmer switch 110 may be coupled in series electrical connection between an AC power source 102 and a lighting load 104 for controlling the amount of power delivered to the lighting load. The dimmer switch 110 may be wall-mounted in a standard electrical wallbox, or alternatively implemented as a table-top load control device. The dimmer switch 110 comprises a faceplate 112 and a bezel 113 received in an opening of the faceplate. The dimmer switch 110 further comprises a toggle actuator 114 and an intensity adjustment actuator 116. Actuations of the toggle actuator 114 toggle, e.g., alternatingly turn off and on, the lighting load 104. Actuations of an upper portion 116A or a lower portion 116B of the intensity adjustment actuator 116 may respectively increase or decrease the amount of power delivered to the lighting load 104 and thus increase or decrease the intensity of the lighting load 104 from a minimum (i.e., low-end) intensity (e.g., approximately 1-10%) to a maximum (i.e., high-end) intensity (e.g., approximately 100%). A plurality of visual indicators 118, e.g., light-emitting diodes (LEDs), may be arranged in a linear array on the left side of the bezel 113. The visual indicators 118 are illuminated to provide visual feedback of the intensity of the lighting load 104. An example of a dimmer switch having a toggle actuator and an intensity adjustment actuator is described in greater detail in U.S. Pat. No. 5,248,919 ("the 919 patent"), issued Sep. 28, 1993, entitled LIGHTING CONTROL DEVICE, the entire disclosure of which is hereby incorporated by reference. Alternatively, the dimmer switch 110 could be replaced by an electronic switch for simply turning the lighting load 104 on and off. The electronic switch may include a single visual indicator, e.g., the middle indicator of the visual indicators 118 of the dimmer switch 110.

For example, the dimmer switch 110 may include an optical receiver 119. The optical receiver 119 may be used to receive optical signals from the wireless control device 120. Optical signals may be free-space optical communications or communications via physical connections. For example, free space optical communications may include communications via air, while physical optical communications may include communications via optical fiber cable or an optical transmission pipe. The optical signals may also be included in visible light, e.g., a flashing light, or non-visible light, e.g., infrared, spectrums.

The optical signals may provide instructions for programming and/or adjusting the operating parameters (e.g., the low-end intensity and the high-end intensity) of the dimmer switch 110. For example, the optical signals may be used to configure the dimmer switch such that the dimmer switch 110 is operable to receive the RF signals 106 from the wireless control device 120 as will be described in greater detail below. The optical signals may also be used to control or program the lighting configurations of the dimmer switch 110. And, though examples described herein may be described with respect to using optical signals or other signals to program or control a dimmer switch from a wireless control device, such signals may be used to program or control any device that is capable of receiving instructions via such optical or other signals, such as shades, thermostats, plug-in devices, or the like.

Wireless load control devices are described in greater detail in commonly-assigned U.S. Pat. No. 5,838,226, issued Nov. 17, 1998, entitled COMMUNICATION PROTOCOL FOR TRANSMISSION SYSTEM FOR CONTROLLING AND DETERMINING THE STATUS OF ELECTRICAL DEVICES FROM REMOTE LOCATIONS; U.S. Pat. No. 6,803,728, issued Oct. 12, 2004, entitled SYSTEM FOR CONTROL OF DEVICES; U.S. patent application Ser. No. 12/033,223, filed Feb. 19, 2008, entitled COMMUNICATION PROTOCOL FOR A RADIO-FREQUENCY LOAD CONTROL SYSTEM; and U.S. patent application Ser. No. 13/234,573, filed Sep. 16, 2011, entitled DYNAMIC KEYPAD FOR CONTROLLING ENERGY-SAVINGS SETTINGS OF A LOAD CONTROL SYSTEM; the entire disclosures of which are hereby incorporated by reference.

The wireless control device 120 has a visual display 122, which may comprise a touch screen having, for example, a capacitive touch pad displaced overtop the visual display, such that the visual display may display soft buttons that may be actuated by a user. Alternatively, the wireless control device 120 may comprise a plurality of hard buttons (e.g., physical buttons) in addition to the visual display 122. The wireless control device 120 may download a product control application for allowing the user to control the lighting load 104. In response to actuations of the displayed soft buttons or hard buttons, the wireless control device 120 transmits digital messages to the dimmer switch 110 directly or through other wireless communications described herein. For example, the digital messages may be transmitted via Wi-Fi communication using the wireless router 130. The dimmer switch 110 may adjust the intensity of the lighting load 104 in response to commands included in the digital messages, such that the dimmer switch controls the lighting load in response to actuations of the soft buttons or hard buttons of the wireless control device 120.

In addition, the wireless control device 120 may be controlled to transmit optical signals, near field communication (NFC) signals, or RF signals according to a proprietary RF communication protocol (such as, for example, the Clear Connect™ protocol) as described herein. For example, the visual display 122 may be controlled to transmit optical signals to the optical receiver 119 of the dimmer switch 110 (as will be described in greater detail below).

The dimmer switch 110 and the wireless control device 120 may both be assigned a unique address for wireless communications described herein. For example, where wireless communications are performed using a Wi-Fi communication link, a Media Access Control (MAC) address may be assigned (e.g., during manufacture). The wireless control device 120 may connect to the wireless LAN via the wireless router 130 using standard procedures. The wireless control device 120 is assigned an Internet Protocol (IP) address upon connecting to the wireless LAN. The wireless control device 120 may store the service set identifier (SSID) and the SSID password of the wireless LAN. After obtaining the IP address, the wireless control device 120 is able to assign an IP address (e.g., different from the IP address of the wireless control device 120) to the dimmer switch 110. Alternatively, the dimmer switch 110 may be operable to obtain the IP address from the wireless router 130 using, for example, procedures defined by the Wi-Fi Protected Setup standard.

The dimmer switch 110 may be associated with (e.g., assigned to) the wireless control device 120, such that the wireless control device may transmit commands for controlling the intensity of the lighting load 104 or programming the dimmer switch 110. Such commands may be transmitted to the dimmer switch 110 via the RF signals 106. Digital messages transmitted to and from the dimmer switch 110 may include, for example, the MAC address and the IP address of the dimmer switch 110. The dimmer switch 110 is operable to turn the lighting load 104 on and off. The dimmer switch 110 is also operable to adjust the intensity of the lighting load in response to received digital messages, including the MAC address and the IP address of the dimmer switch, for example. In addition, the wireless router 130 may be operable to receive commands for controlling the lighting load 104 from the Internet, and may wirelessly transmit corresponding digital messages to the dimmer switch 110.

The dimmer switch 110 may be assigned an IP address, an SSID, an SSID password, and/or a software AP at manufacture, such that the dimmer switch 110 may act as an AP for other communication devices in a LAN. The wireless control device 120 may recognize the dimmer switch 110 as an AP and may connect to the LAN via the dimmer switch 110. For example, the dimmer switch 110 may connect to router 130 or may perform the functions of the router 130 itself.

The dimmer switch 110 may also connect to the wireless LAN to discover other dimmer switches (not shown). The dimmer switch 110 may discover the other dimmer switches using any discovery protocol, such as Bonjour, Simple Service Discovery Protocol (SSDP), Bluetooth® Service Discovery Protocol (SDP), DNS service discovery (DNS-SD), Dynamic Host Configuration Protocol (DHCP), Internet Storage Name Service (iSNS), Jini for Java objects, Service Location Protocol (SLP), Session Announcement Protocol (SAP) for RTP sessions, Simple Service Discovery Protocol (SSDP) for Universal Plug and Play (UPnP), Universal Description Discovery and Integration (UDDI) for web services, Web Proxy Autodiscovery protocol (WPAD), Web Services Dynamic Discovery (WS-Discovery), XMPP Service Discovery (XEP-0030), and/or XRDS for XRI, OpenID, OAuth, etc. Upon the dimmer switch 110 discovering one or more other dimmer switches, the dimmer switch may create a peer-to-peer network of dimmer switches capable of communicating with one another. For example, the dimmer switches may communicate programming and/or control instructions received from the wireless control device 120.

The wireless control device 120 may control the lighting load 104 by communicating instructions to the dimmer switch 110 via the RF signals 106 that cause the dimmer switch 110 to execute control instructions that have been pre-programmed on the dimmer switch 110. For example, the dimmer switch 110 may be pre-programmed at manufacture or via an update to execute the control instructions. The control instructions may include pre-configured settings (e.g., protected or locked lighting presets), instructions for raising/lowering lighting level, instructions for fading, instructions for scheduling, instructions for turning lights on/off, or any other pre-programmed instruction, for example.

The wireless control device 120 may also program the settings (i.e., the operating parameters) of the dimmer switch 110 (e.g., when the dimmer switch is in programming mode). For example, the dimmer switch 110 may be a dimmer switch that may have a limited user interface (UI) or may not have any user interface. As such, the user interface of the wireless control device 120 may be used to program the dimmer switch 110. For example, various wireless communication links described herein, e.g., Wi-Fi signals, optical signals, near field communication (NFC) signals, or proprietary-protocol RF signals, may be used to program any of a number of programmable features provided by the dimmer switch 110. Such features may be selected via the wireless control device 120. For example, the wireless control device 120 may program the dimmer switch 110 with such features as protected or locked presets, high-end trim, low-end trim, adjustable delay, fade time, load type, performing communications via wireless communication modes (e.g., as described herein), or being compatible with different lamps. In addition, the wireless control device 120 may be operable to program the dimmer switch 110 to change between modes of operation, for example, between a switching mode, a dimming mode, and/or an electronic timer mode (e.g., a countdown timer mode). The programming signal may be a one-way or two-way serial communication with the dimmer switch 110.

A protected preset is a feature that allows the user to lock the present light intensity level as a protected preset lighting intensity to which the dimmer may set the lighting load 104. For example, when the dimmer switch 110 is turned on while a protected preset is disabled, the dimmer may set the lighting load 104 to the intensity level at which the dimmer was set when the lighting load was last turned off. When the dimmer switch 110 is turned on while protected preset is enabled, the dimmer may set the lighting load 104 to the protected preset intensity level, for example. The protected preset value may be user-programmed. For example, the user may select a value from among a plurality of allowable values for the protected preset light intensity level. When the lighting load 104 is turned on with protected preset enabled, a processor or controller may access a memory in the dimmer switch 110 to retrieve the user-selected value, and cause the lighting load 104 to be set to the intensity level represented by that value.

High-end trim (i.e., high-end intensity) is a feature that governs the maximum intensity level to which the lighting load 104 may be set by the dimmer switch 110. Values for the high-end trim may range between about 60% and about 100% of full intensity, for example. For example, the high-end trim may be pre-programmed to be about 90% of full intensity. In a dimmer switch 110, high-end trim is a feature that may be user-programmed as described herein.

Similarly, low-end trim (i.e., low-end intensity) is a feature that governs the minimum intensity level to which the lighting load 104 may be set by the dimmer switch 110. Values for the low-end trim may range between about 1% and about 20% of full intensity, for example. For example, the low-end trim may be preprogrammed to be about 10% of full intensity. In a dimmer switch 110, low-end trim is a feature that may be user-programmed as described herein.

Delay-to-off is a feature that causes the lighting load 104 to remain at a certain intensity level for a prescribed period of time before fading to off. Such a feature may be desirable in certain situations, such as, for example, when a user wishes to turn out bedroom lights before retiring, but still have sufficient light to make his way safely to bed from the location of the dimmer switch 110 before the lights are completely extinguished. Similarly, the night staff of a large building may wish to extinguish ambient lights from a location that is some distance away from an exit, and may wish to delay the fade to off for a period of time sufficient for them to walk safely to the exit. Delay-to-off times may range from about 10 seconds to about 60 seconds for example. The delay-to-off time may be user-programmed, as described herein. For example, the user may select a value from among a plurality of allowable values for the delay-to-off time. When the lighting load is turned off with the delay-to-off feature enabled, the dimmer switch 110 may access the user-selected value of delay-to-off feature from memory. The lighting load 104 may remain at the current intensity level for a time represented by the user-selected value of delay-to-off feature.

Fading is a feature whereby the dimmer causes the lighting load 104 to change from one intensity level to another at a certain rate or plurality of successive rates based on different closures of the toggle switch or indicated in the instructions received from the wireless control device 120 and depending on the state of lighting load 104. Examples of fading are described in greater detail in the 919 patent. U.S. Pat. No. 7,071,634, issued Jul. 4, 2006, entitled LIGHTING CONTROL DEVICE HAVING IMPROVED LONG FADE OFF, discloses a lighting control device that is capable of activating a long fade off from any light intensity and is incorporated herein by reference. Any or all of the features that define the fade features may be user-programmed via the wireless control device 120.

Another feature that may be programmed as described herein is load type. The load type may be inductive, resistive, or capacitive. Forward phase-controlled dimming may be desirable where the load is inductive or resistive; reverse phase-controlled dimming may be desirable where the load is capacitive. Thus, the load type may be defined, at least in part, by a feature having a value associated with either forward phase control or reverse phase control.

In addition, the dimmer switch 110 may comprise an occupancy sensor or may be responsive to a remote occupancy sensor, and may store operating parameters, such as an occupancy sensor sensitivity setting or timeout value that may be programmed by the wireless control device 120. The wireless control device 120 may also be operable to program the dimmer switch 110 to operate in one of an occupancy mode and a vacancy mode. In the occupancy mode, the dimmer switch 110 operates to turn a controlled lighting load on and off in response to the occupancy sensor. In the vacancy mode, the dimmer switch 110 operates to turn the lighting load off in response to the occupancy sensor. Examples of occupancy and vacancy sensors are described in greater detail in commonly-assigned U.S. Pat. No. 7,940,167, issued May 10, 2011, entitled BATTERY-POWERED OCCUPANCY SENSOR; U.S. Pat. No. 8,009,042, issued Aug. 30, 2011, entitled RADIO-FREQUENCY LIGHTING CONTROL SYSTEM WITH OCCUPANCY SENSING; and U.S. Pat. No. 8,199,010, issued Jun. 12, 2012, entitled METHOD AND APPARATUS FOR CONFIGURING A WIRELESS SENSOR, the entire disclosures of which are hereby incorporated by reference.

Figure 3A:
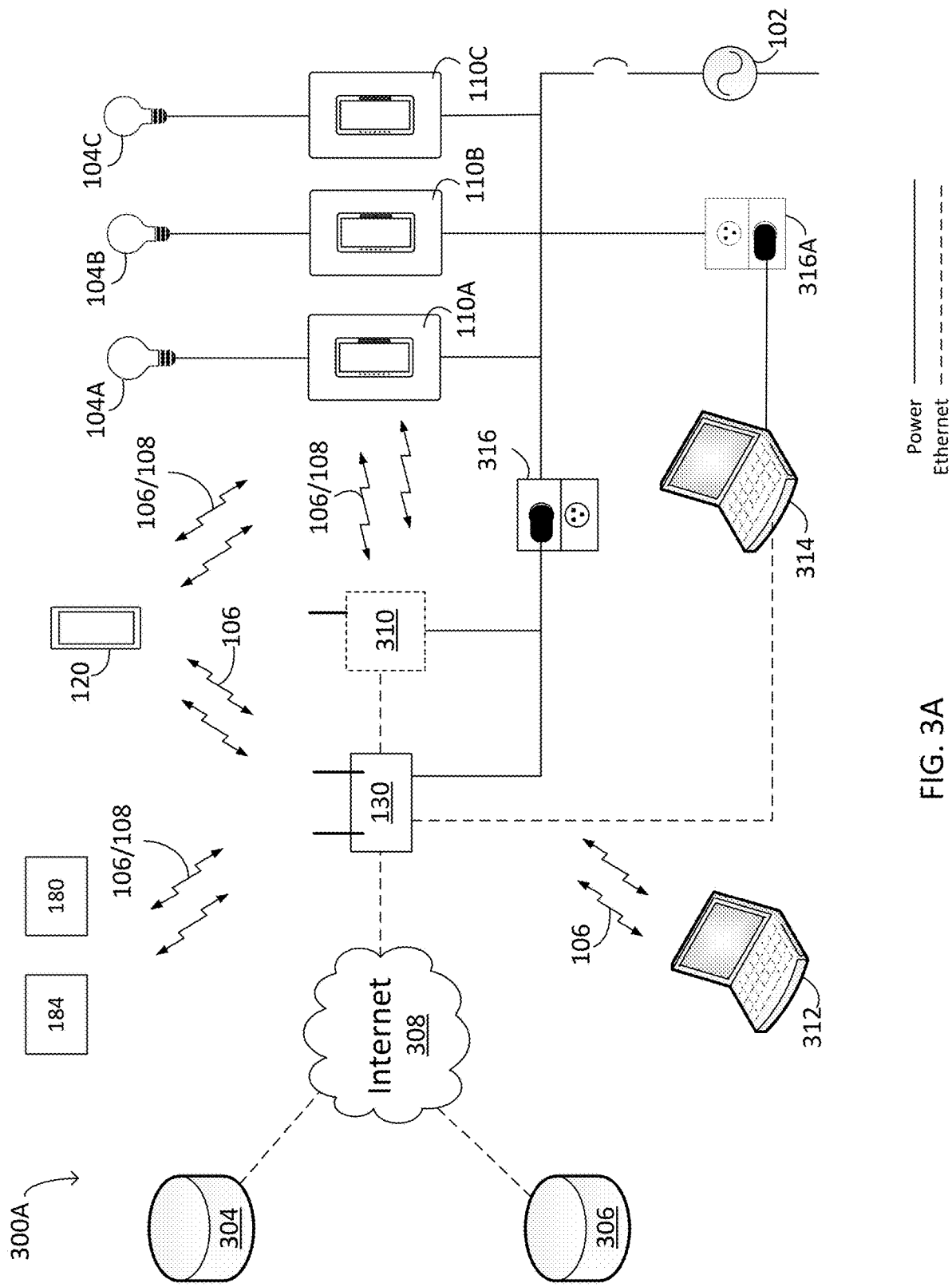
FIG. 3A is a diagram of a first example network in which one or more contemplated devices and techniques may be employed.

FIG. 3A is a diagram of an exemplary network environment 300A. In FIG. 3A, the router 130 may communicate with one or more servers 304, 306 via the Internet 308, perhaps as accessed through the "cloud." For example, router 130 may establish at least one Internet Protocol (IP) connection with either server 304 and/or 306. The at least one IP connection between the router 130 and either server 304 and/or 306 may be made via a router's 130 public IP address (and the respective public IP addresses of server 304 and/or server 306). Any number of devices in FIG. 3A, such as, for example, the router 130, laptop 314, dimmer switch 110A, dimmer switch 110B, and/or dimmer switch 110C, among other devices, may be connected to the AC power supply 102, perhaps via a hardwired connection or via electrical outlets 316 and 316A, for example. Dimmer switch 110A, dimmer switch 110B, and/or dimmer switch 110C may operate lighting load 104A lighting load 104B, and/or lighting load 104C as described previously herein. Occupancy sensor 180 may communicate with the router 130 and/or dimmer switches 110A, 110B, and/or 110C, perhaps to adjust the intensity of one or more of the dimmer switches 110A, 110B, and/or 110C based on a detected occupancy of the environment 300A. A user may activate one or more of the buttons (soft buttons or hard buttons (e.g. physical buttons or manual operators)) on the remote controller 184, which may communicate with the router 130 and/or dimmer switches 110A, 110B, and/or 110C to adjust the intensity of one or more of the dimmer switches 110A, 110B, and/or 110C. And a user may override the occupancy sensor's 180 control of the dimmer switches 110A, 110B, and/or 110C, for example.

The router 130 may establish a non-public (or private) IP address for the router 130 and may establish an IP connection and corresponding respective private IP addresses with the laptop 312 and/or the laptop 314. The router 130 may coordinate one or more of the respective private IP addresses with one or more IP flows (e.g., multimedia or data) that are received via the router's 130 public IP address (e.g., from the server 304 and/or 306). The router 130 may coordinate one or more of the respective public IP addresses (e.g., of the server 304 and/or server 306) with one or more IP flows (e.g., multimedia or data) that are sent to the router's 130 private IP address (e.g., from laptop 312 and/or laptop 314). The router 130 may perform such coordination via a Network Address Table (NAT) (not shown), or the like, for example.

The wireless control device 120, the occupancy sensor 180, and/or the remote controller 184 may be operable to transmit and receive RF signals 106 including Internet Protocol packets directly to dimmer switches 110A, 110B, and/or 110C, or to dimmer switches 110A, 110B, and/or 110C via the wireless router 130. The router 130 may be operable to transmit one or more digital messages via RF signals 106 that may correspond to the RF signals 106 received from the wireless control device 120, the occupancy sensor 180, and/or the remote controller 184. The one or more digital messages may be transmitted according to a proprietary RF communication protocol (such as, for example, the Clear Connect™ protocol) to the dimmer switch 110A, dimmer switch 110B, and/or dimmer switch 110C via RF signals 108. The dimmer switch 110A, dimmer switch 110B and/or dimmer switch 110C may include a wireless communication module (e.g. circuit) operable to receive digital messages according to the proprietary RF communication protocol via the RF signals 108. The router 130 may communicate with the laptop 314 via an Ethernet based IP protocol (e.g., TCP/IP and/or "HomePlug") that may be carried via the conductors that deliver electrical energy from the AC power source 102 to the various devices such as the router 130 and laptop 314, among other devices illustrated in FIG. 3A.

In FIG. 3A, a communication dongle (not shown) could be connected to the wireless control device 120 that may allow for direct communication between the wireless control device 120 and the dimmer switch 110A, dimmer switch 110B, and/or dimmer switch 110C using the proprietary RF communication protocol via RF signals 108. For example, the communication dongle could be plugged into a headphone jack on the wireless control device 120, or a USB port on 120. The occupancy sensor 180 and/or the remote controller 184 may communicate with the dimmer switches 110A, 110B, and/or 110C using the proprietary RF communication protocol via RF signals 108.

The router 130 may further establish IP connections and corresponding respective private IP addresses with the occupancy sensor 180, remote controller 184, dimmer switch 110A, 110B, and/or 110C. In such situations, the router 130 may coordinate one or more of the respective private IP addresses of the occupancy sensor 180, remote controller 184, dimmer switch 110A, dimmer switch 110B, and/or dimmer switch 110C with one or more IP flows (e.g., multimedia or data) that are received via the router's 130 public IP address (e.g., from the server 304 and/or 306). The router 130 may coordinate one or more of the respective public IP addresses (e.g., of the server 304 and/or server 306) with one or more IP flows (e.g., multimedia or data) that are sent to the router's 130 private IP address (e.g., from the occupancy sensor 180, remote controller 184, dimmer switch 110A, dimmer switch 110B, and/or dimmer switch 110C).

When dimmer switch 110A, dimmer switch 110B, and/or dimmer switch 110C may be assigned private IP addresses, the wireless control device 120, the occupancy sensor 180, and/or the remote controller 184 (among other devices with private IP addresses) may transmit RF signals 106 including Internet Protocol packets to the dimmer switch 110A, dimmer switch 110B, and/or dimmer switch 110C. For example, the wireless control device 120, the occupancy sensor 106, the remote controller 184, the router 130, the laptop 312, and/or the laptop 314 may transmit the RF signals 106 directly to the dimmer switch 110A, dimmer switch 110B, and/or dimmer switch 110C via a point-to-point communication, such as a Wi-Fi communication link, e.g., an 802.11 wireless local area network (LAN), or other direct wireless communication link, e.g., a Wi-MAX communication link or a Bluetooth® communication link. The wireless control device 120 may communicate with the laptop 314 via one or more devices that have a private IP address and are connected to the AC powers source 102 via an Ethernet IP based protocol (e.g. TCP/IP and/or "HomePlug") that may be carried via the conductors that deliver electrical energy from the AC power source 102 to the various devices (e.g., router 130, and/or laptop 314).

Figure 3B:
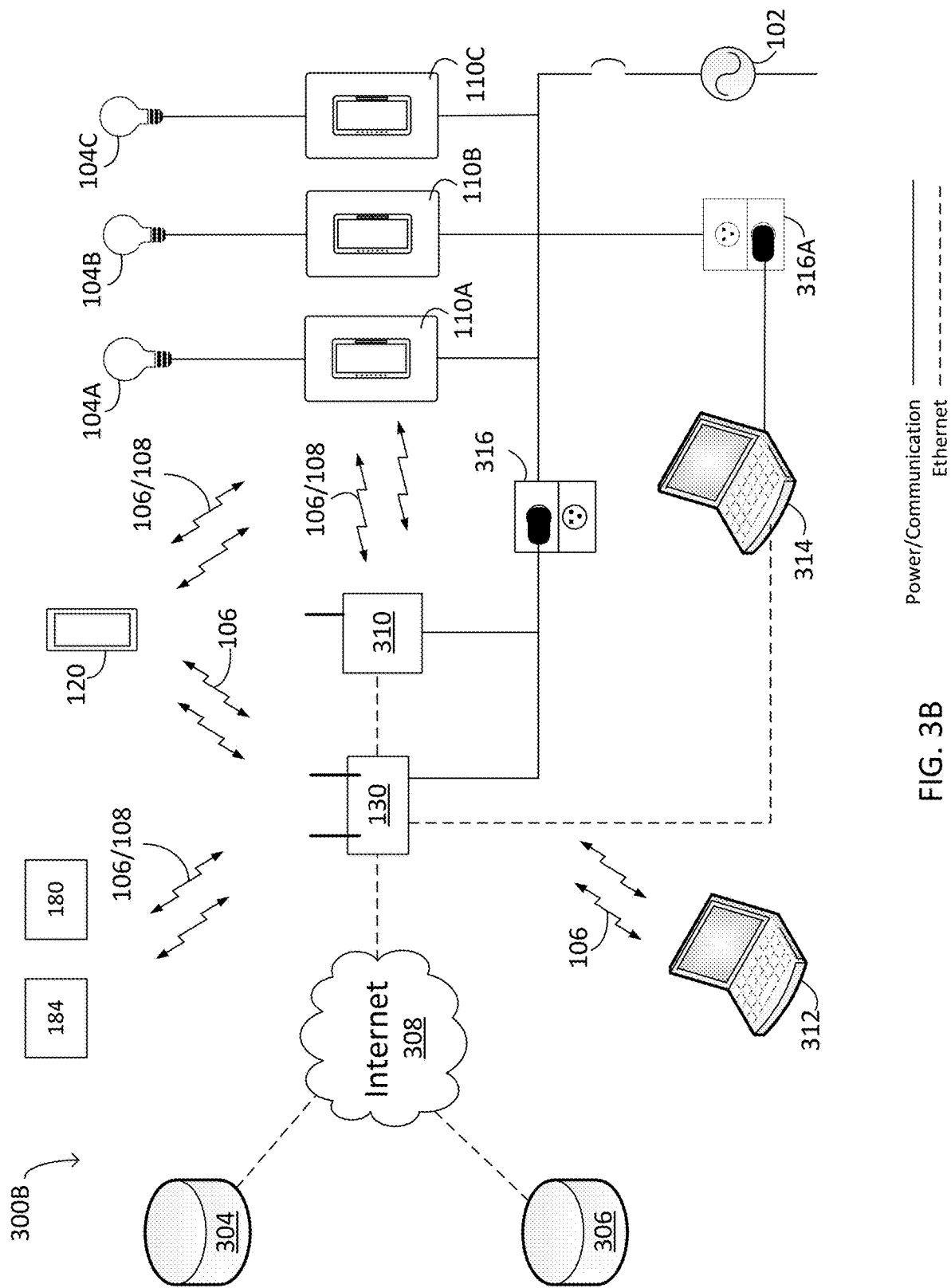
FIG. 3B is a diagram of a second example network in which one or more contemplated devices and techniques may be employed.

FIG. 3B is a diagram of an exemplary network environment 300B. In FIG. 3B, the router 130 may communicate with one or more servers 304, 306 via the Internet 308, perhaps as accessed through the "cloud." For example, router 130 may establish at least one Internet Protocol (IP) connection with either server 304 and/or 306. The at least one IP connection between the router 130 and either server 304 and/or 306 may be made via a router's 130 public IP address (and the respective public IP addresses of server 304 and/or server 306). Any number of devices in FIG. 3B, such as, for example, the router 130, laptop 314, dimmer switch 110A, dimmer switch 110B, and/or dimmer switch 110C, among other devices, may be connected to the AC power supply 102, perhaps via a hardwired connection or via electrical outlets 316 and 316A, for example. Dimmer switch 110A, dimmer switch 110B, and/or dimmer switch 110C may operate lighting load 104A lighting load 104B, and/or lighting load 104C as described previously herein. Occupancy sensor 180 may communicate with the router 130 and/or dimmer switches 110A, 110B, and/or 110C, perhaps to adjust the intensity of one or more of the dimmer switches 110A, 110B, and/or 110C based on a detected occupancy of the environment 300B. A user may activate one or more of the buttons (soft buttons or hard buttons (e.g. physical buttons or manual operators)) on the remote controller 184, which may communicate with the router 130 and/or dimmer switches 110A, 110B, and/or 110C to adjust the intensity of one or more of the dimmer switches 110A, 110B, and/or 110C. And a user may override the occupancy sensor's 180 control of the dimmer switches 110A, 110B, and/or 110C by activating one or more of the buttons of the remote controller 184, for example.

The router 130 may establish a non-public (or private) IP address for the router 130 and may establish an IP connection and corresponding respective private IP addresses with the laptop 312 and/or the laptop 314. The router 130 may coordinate one or more of the respective private IP addresses with one or more IP flows (e.g., multimedia or data) that are received via the router's 130 public IP address (e.g., from the server 304 and/or 306). The router 130 may coordinate one or more of the respective public IP addresses (e.g., of the server 304 and/or server 306) with one or more IP flows (e.g., multimedia or data) that are sent to the router's 130 private IP address (e.g., from laptop 312 and/or laptop 314). The router 130 may perform such coordination via a Network Address Table (NAT) (not shown), or the like, for example.

The wireless control device 120, the occupancy sensor 180, and/or the remote controller 184 may be operable to transmit and receive RF signals 106 including Internet Protocol packets directly to dimmer switches 110A, 110B, and/or 110C, or to dimmer switches 110A, 110B, and/or 110C via the wireless router 130. The router 130 may be operable to transmit one or more digital messages via RF signals 106 that may correspond to the RF signals 106 received from the wireless control device 120, the occupancy sensor 180, and/or the remote controller 184. The one or more digital messages may be transmitted according to a proprietary RF communication protocol (such as, for example, the Clear Connect™ protocol) to the dimmer switch 110A, dimmer switch 110B, and/or dimmer switch 110C via RF signals 108. The dimmer switch 110A, dimmer switch 110B and/or dimmer switch 110C may include a wireless communication module (e.g. circuit) operable to receive digital messages according to the proprietary RF communication protocol via the RF signals 108. The router 130 may communicate with the laptop 314, dimmer switch 110A, dimmer switch 110B, and/or dimmer switch 110C via an Ethernet based IP protocol (e.g., TCP/IP and/or "HomePlug") that may be carried via the conductors that deliver electrical energy from the AC power source 102 to the various devices such as the router 130, laptop 314, dimmer switch 110A, dimmer switch 110B, and/or dimmer switch 110C, among other devices illustrated in FIG. 3B.

In FIG. 3B, a communication dongle (not shown) could be connected to the wireless control device 120 that may allow for direct communication between the wireless control device 120 and the dimmer switch 110A, dimmer switch 110B, and/or dimmer switch 110C using the proprietary RF communication protocol via RF signals 108. For example, the communication dongle could be plugged into a headphone jack on the wireless control device 120, or a USB port on 120. The occupancy sensor 180 and/or the remote controller 184 may communicate with the dimmer switches 110A, 110B, and/or 110C using the proprietary RF communication protocol via RF signals 108.

The router 130 may further establish IP connections and corresponding respective private IP addresses with the occupancy sensor 180, remote controller 184, dimmer switch 110A, 110B, and/or 110C. In such situations, the router 130 may coordinate one or more of the respective private IP addresses of the occupancy sensor 180, remote controller 184, dimmer switch 110A, dimmer switch 110B, and/or dimmer switch 110C with one or more IP flows (e.g., multimedia or data) that are received via the router's 130 public IP address (e.g., from the server 304 and/or 306). The router 130 may coordinate one or more of the respective public IP addresses (e.g., of the server 304 and/or server 306) with one or more IP flows (e.g., multimedia or data) that are sent to the router's 130 private IP address (e.g., from the occupancy sensor 180, remote controller 184, dimmer switch 110A, dimmer switch 110B, and/or dimmer switch 110C).

When dimmer switch 110A, dimmer switch 110B, and/or dimmer switch 110C may be assigned private IP addresses, the wireless control device 120, the occupancy sensor 180, and/or the remote controller 184 (among other devices with private IP addresses) may transmit RF signals 106 including Internet Protocol packets to the dimmer switch 110A, dimmer switch 110B, and/or dimmer switch 110C. For example, the wireless control device 120, the occupancy sensor 106, the remote controller 184, the router 130, the laptop 312, and/or the laptop 314 may transmit the RF signals 106 directly to the dimmer switch 110A, dimmer switch 110B, and/or dimmer switch 110C via a point-to-point communication, such as a Wi-Fi communication link, e.g., an 802.11 wireless local area network (LAN), or other direct wireless communication link, e.g., a Wi-MAX communication link or a Bluetooth® communication link. The wireless control device 120, the occupancy sensor 180, and/or the remote controller 184 may communicate with the laptop 314, dimmer switch 110A, dimmer switch 110B, and/or dimmer switch 110C via one or more devices that have a private IP address and are connected to the AC powers source 102 via an Ethernet IP based protocol (e.g. TCP/IP and/or "HomePlug") that may be carried via the conductors that deliver electrical energy from the AC power source 102 to the various devices (e.g., router 130, dimmer switch 110A, dimmer switch 110B, dimmer switch 110C, and/or laptop 314).

Figure 4A:
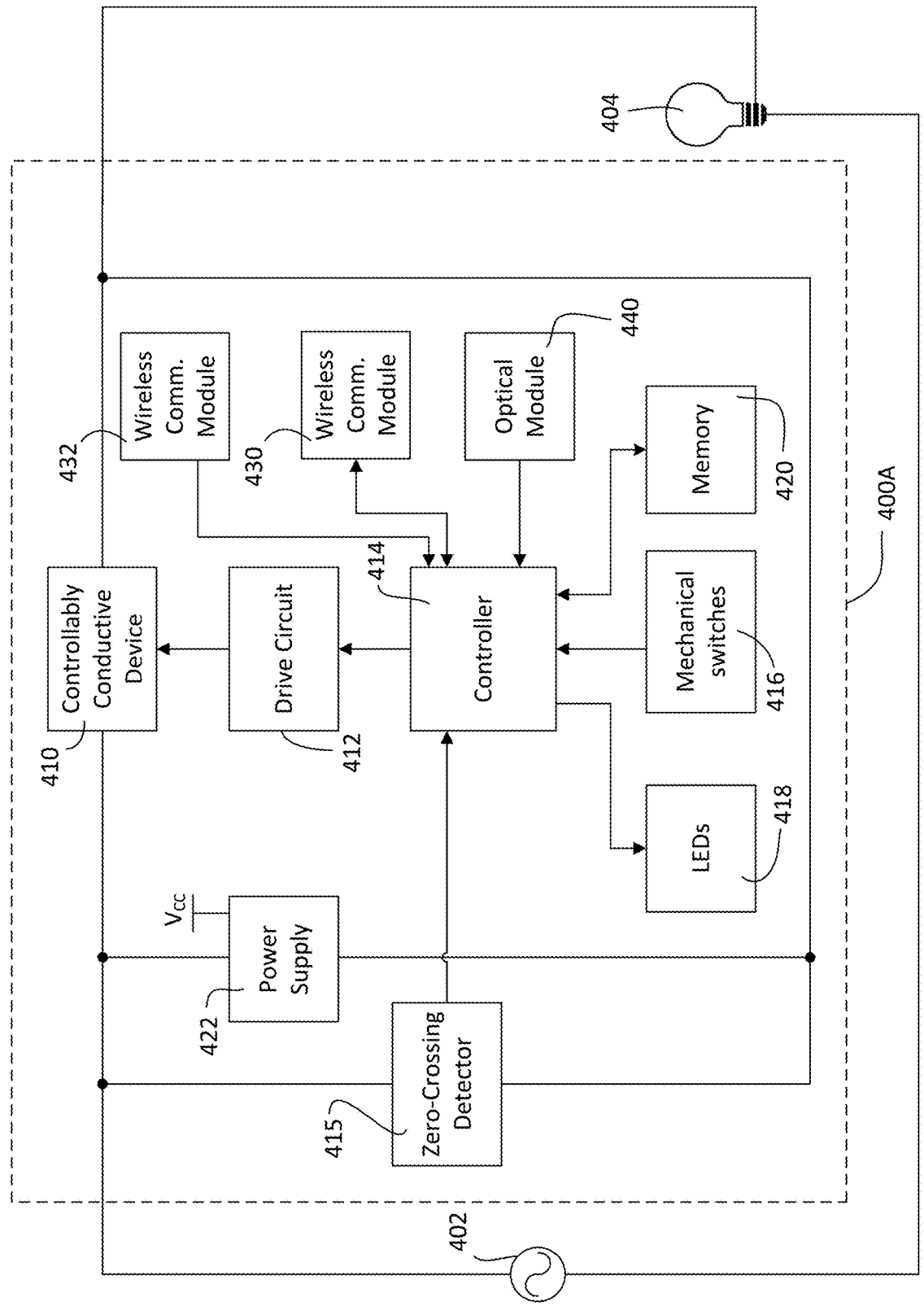
FIG. 4A is a first simplified example block diagram of the dimmer switch of the RF lighting control system of FIG. 2.

FIG. 4A is a simplified block diagram 400A of a first example of dimmer switch 110. The example dimmer switch 110 (400A) comprises a controllably conductive device 410 coupled in series electrical connection between the AC power source 102 and the lighting load 104 for control of the power delivered to the lighting load. The controllably conductive device 410 may comprise a relay or other switching device, or any suitable type of bidirectional semiconductor switch, such as, for example, a triac, a field-effect transistor (FET) in a rectifier bridge, or two FETs in anti-series connection. The controllably conductive device 410 includes a control input coupled to a drive circuit 412.

The dimmer switch 110 (400A) further comprises a controller 414 coupled to the drive circuit 412 for rendering the controllably conductive device 410 conductive or non-conductive to thus control the power delivered to the lighting load 104. The controller 414 may comprise a microcontroller, a programmable logic device (PLD), a microprocessor, an application specific integrated circuit (ASIC), a field-programmable gate array (FPGA), or any suitable processing device or control circuit. A zero-crossing detector 415 determines the zero-crossings of the input AC waveform from the AC power supply 102. A zero-crossing may be the time at which the AC supply voltage transitions from positive to negative polarity, or from negative to positive polarity, at the beginning of each half-cycle. The controller 414 receives the zero-crossing information from the zero-crossing detector 415 and provides the control inputs to the drive circuit 412 to render the controllably conductive device 410 conductive and non-conductive at predetermined times relative to the zero-crossing points of the AC waveform.

The controller 414 receives inputs from mechanical switches 416 that are mounted on a printed circuit board (not shown) of the dimmer switch 110 (400A), and are arranged to be actuated by the toggle actuator 114 and the intensity adjustment actuator 116. The controller 414 also controls light-emitting diodes 418, which are also mounted on the printed circuit board. The light emitting diodes 418 may be arranged to illuminate the visual indicators 118 on the front surface of the dimmer switch 110 (400A), for example, through a light pipe structure (not shown). The controller 414 is also coupled to a memory 420 for storage of unique identifiers (e.g., the MAC address and the IP address) of the dimmer switch 110 (400A), the SSID and the SSID password of the wireless LAN, instructions for controlling the lighting load 104, programming instructions for communicating via a wireless communication link, or the like. The memory 420 may be implemented as an external integrated circuit (IC) or as an internal circuit of the controller 414. A power supply 422 generates a direct-current (DC) voltage $V_{CC}$ for powering the controller 414, the memory 420, and other low-voltage circuitry of the dimmer switch 110 (400A).

The dimmer switch 110 (400A) further includes a wireless communication module (e.g. circuit) 430 for transmitting and receiving the RF signals 106 and/or 108 to and from the wireless control device 120 and/or the wireless router 130. For example, the wireless communication module 430 may be configured to communicate via a Wi-Fi communication link, a Wi-MAX communication link, a Clear Connect™ communication link, and/or a Bluetooth® communication link. The wireless communication module 430 may also include one or more other radio protocol modules (e.g. radios) that may be operable to communicate via a number of other protocols including Wi-Fi and/or a reliable RF protocol such as Clear Connect™. The dimmer switch 110 (400A) may further include a second wireless communication module (e.g. circuit) 432 that may be configured to communicate via a Wi-Fi communication link, a Wi-MAX communication link, a Clear Connect™ communication link, and/or a Bluetooth® communication link. The wireless communication module 432 may also include one or more other radio protocol modules (e.g. radios) that may be operable to communicate via a number of other protocols including Wi-Fi and/or a reliable RF protocol such as Clear Connect™.

When the wireless communication modules 430 and/or 432 comprise a Wi-Fi module, the controller 414 is operable to control the lighting load 104 in response to received digital messages in Wi-Fi packets (i.e., Internet Protocol packets received via the Wi-Fi signals). The wireless communication module 430 and/or 432 may comprise one or more RF transceivers and one or more antennas. Examples of antennas for wall-mounted dimmer switches are described in greater detail in U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

The dimmer switch 110 (400A) further comprises an optical module (e.g. circuit) 440, such as an optical signal receiving circuit for example. The optical module 440 may be optically coupled to the optical receiver 119. The optical module 440 may be coupled to the optical receiver 119 on the front surface of the dimmer switch 110 (400A), for example, through a light pipe (not shown), such that the optical module 440 may receive the optical signals from the wireless control device 120 via the light pipe. For example, the optical module 440 may comprise a photodiode (not shown) that is responsive to the optical signals transmitted by the wireless control device 120. In addition, the photodiode of the optical module 440 may be controlled by the controller 414, so as to transmit optical signals to the wireless control device 120 (as will be described in greater detail below), for example.

The wireless control device 120 may control the controllably conductive device 410 using the optical signals and/or the digital messages received via the RF signals 106 and/or RF signals 108. For example, the controller 414 may determine the module from which the signals are received, e.g., from the wireless communication module 430 and/or 432 or the optical module 440, and the controllably conductive device 410 may be controlled based on those signals. The controller 414 may also transmit messages to the wireless control device 120 via optical signals or digital messages transmitted via the RF signals 106 and/or RF signals 108. For example, the controller 414 of the dimmer switch 110 (400A) may be used to transmit digital messages to the wireless control device 120 via wireless communication. The digital messages may include alerts and/or feedback and status information regarding the lighting load 104. The digital messages may also include error messages or indications as to whether the dimmer switch 110 (400A) is able to communicate via a wireless communication link or RF signals 106 and/or RF signals 108, for example.

Figure 4B:
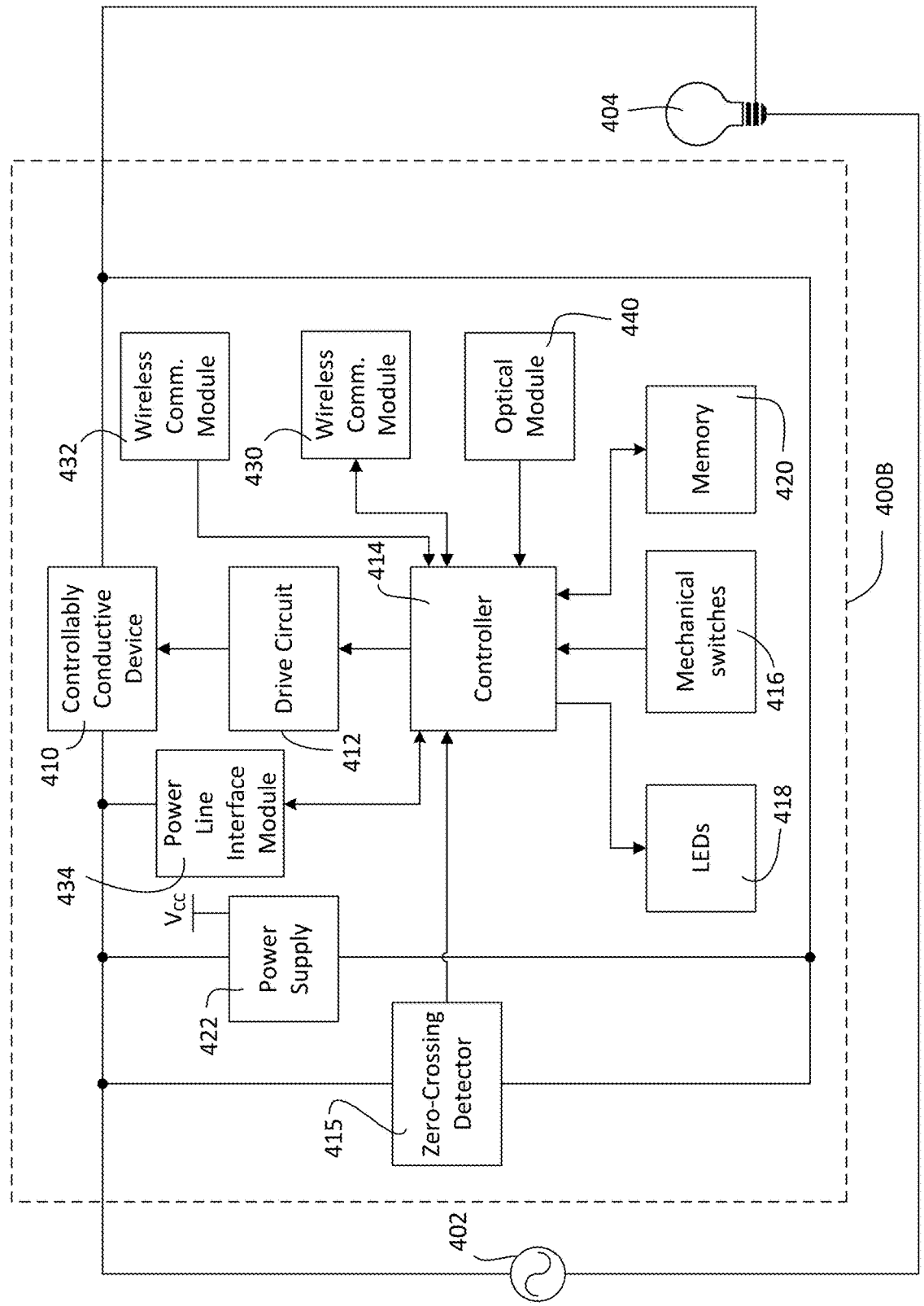
FIG. 4B is a second simplified example block diagram of the dimmer switch of the RF lighting control system of FIG. 2.

FIG. 4B is a simplified block diagram 400B of a third example of dimmer switch 110. The example dimmer switch 110 (400B) comprises a controllably conductive device 410, a drive circuit 412, a controller 414, a zero-crossing detector 415, mechanical switches 416, light-emitting diodes 418, a memory 420, a power supply 422, and an optical module 440, power supply 102, and lighting load 104. The elements within these devices, the functions of these devices, and/or interactions of and among these devices may be the same or similar as described with respect to FIG. 4A.

The dimmer switch 110 (400B) further includes a wireless communication module (e.g. circuit) 430 for transmitting and receiving the RF signals 106 and/or 108 to and from the wireless control device 120 and/or the wireless router 130. For example, the wireless communication module 430 may be configured to communicate via a Wi-Fi communication link, a Wi-MAX communication link, a Clear Connect™ communication link, and/or a Bluetooth® communication link. The wireless communication module 430 may also include one or more other radio protocol modules (e.g. radios) that may be operable to communicate via a number of other protocols including Wi-Fi and/or a reliable RF protocol such as Clear Connect™. The dimmer switch 110 (400B) may further include a second wireless communication module (e.g. circuit) 432 that may be configured to communicate via a Wi-Fi communication link, a Wi-MAX communication link, a Clear Connect™ communication link, and/or a Bluetooth® communication link. The wireless communication module 432 may also include one or more other radio protocol modules (e.g. radios) that may be operable to communicate via a number of other protocols including Wi-Fi and/or a reliable RF protocol such as Clear Connect™. The dimmer switch 110 (400B) may further include a power line interface module (e.g. circuit) 434 for transmitting and receiving signals carried on the conductors connected to the AC power source 102 via an Ethernet IP based protocol (e.g. TCP/IP, and/or a power line communication protocol such as "HomePlug") where the conductors may deliver electrical energy from the AC power source 102 to the dimmer switch 110 (400B). The power line interface module 434 may also transmit, receive, and/or interpret energy pulses that may be used to convey signals and/or information via the conductors may deliver electrical energy from the AC power source 102 to the dimmer switch 110 (400B).

When the wireless communication modules 430 and/or 432 comprise a Wi-Fi module, the controller 414 is operable to control the lighting load 104 in response to received digital messages in Wi-Fi packets (i.e., Internet Protocol packets received via the Wi-Fi signals). The wireless communication module 430 and/or 432 may comprise one or more RF transceivers and one or more antennas. Examples of antennas for wall-mounted dimmer switches are described in greater detail in the aforementioned U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference (as indicated previously).

The wireless control device 120 may control the controllably conductive device 410 using the optical signals and/or the digital messages received via the RF signals 106 and/or RF signals 108. For example, the controller 414 may determine the module from which the signals are received, e.g., from the wireless communication module 430 and/or 432 or the optical module 440, and the controllably conductive device 410 may be controlled based on those signals. The controller 414 may also transmit messages to the wireless control device 120 via optical signals or digital messages transmitted via the RF signals 106 and/or RF signals 108. For example, the controller 414 of the dimmer switch 110 (400B) may be used to transmit digital messages to the wireless control device 120 via wireless communication. The digital messages may include alerts and/or feedback and status information regarding the lighting load 104. The digital messages may also include error messages or indications as to whether the dimmer switch 110 (400B) is able to communicate via a wireless communication link or RF signals 106 and/or RF signals 108, for example.

Figure 5A:
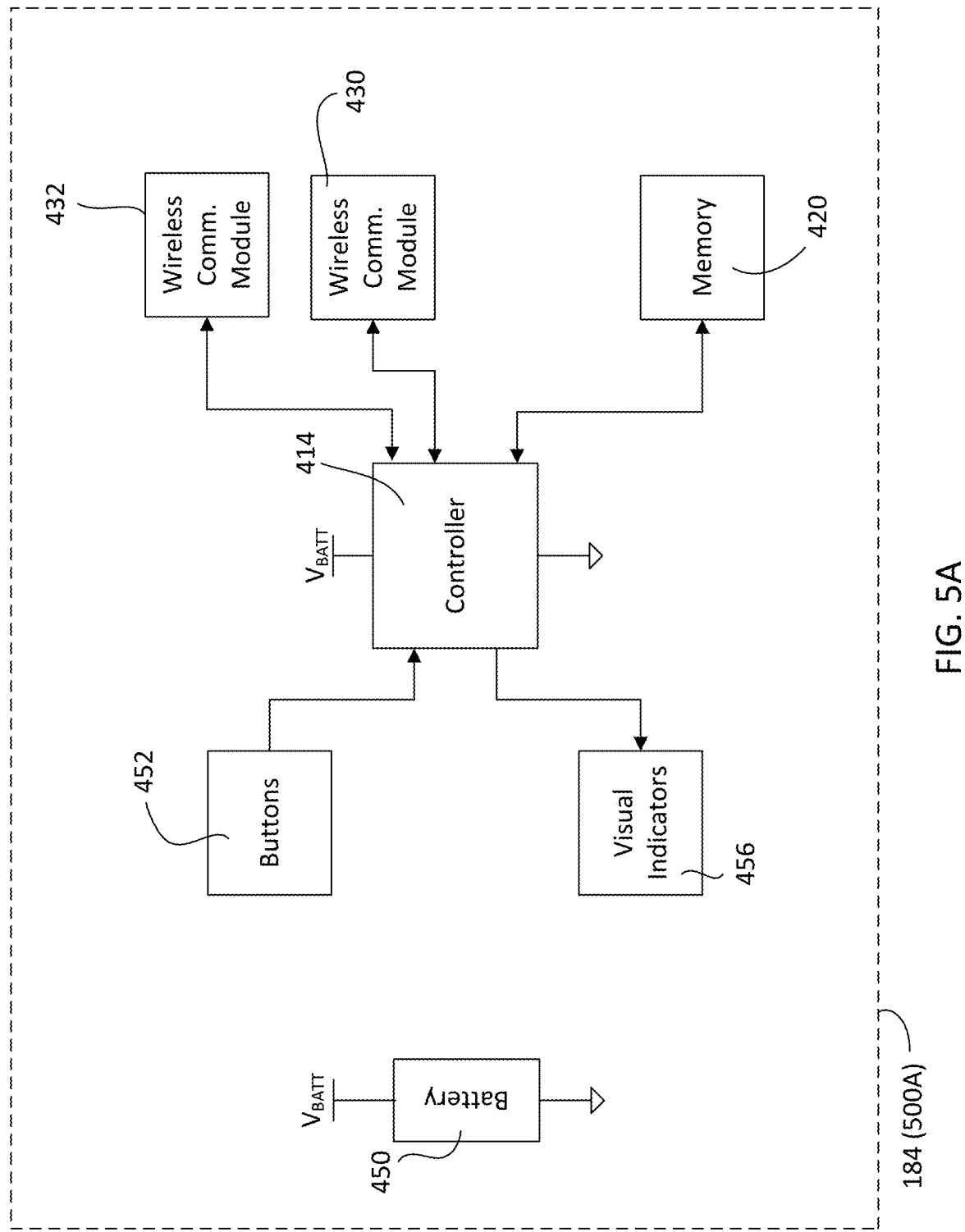
FIG. 5A is a simplified example block diagram of an input device like the remote controller of FIGS. 3A and 3B.

FIG. 5A a first simplified example block diagram 500A of an input device like the remote controller 184 of FIGS. 3A-3B. The example remote controller 184 (500A) may include devices such as a controller 514, a memory 520, a wireless communication module 530, and/or a wireless communication module 532. One or more of the elements within these devices, one or more of the functions of these devices, and/or one or more of the interactions of and among these devices may be the same or similar as described with respect to FIG. 4A. The remote controller 184 (500A) may also include a battery power supply 550 that may provide electrical power to the one or more devices included in the remote controller 184 (500A), such as the controller 514.

The example remote controller 184 (500A) may also include buttons 552, visual indicators 556, and/or a battery 550. The controller 514 of 500A may be configured to receive commands input via the one or more buttons 552. The one or more buttons 552 may include one or more soft buttons or one or more hard buttons (e.g. physical buttons or manual operators). For example, the controller 514 may interpret inputs via the one or more buttons 552 as user commands intended for one or more devices (e.g. a dimmer switch). Again by way of example, a user may contact one button of the one or more buttons 552 of remote controller 184 (500A) to order the appropriate dimmer switch (e.g. dimmer switch 110A) to adjust the intensity of lighting load 104A to 50%, among many other configurable adjustments. The controller 514 of 500A may interpret the signal from the one button of the one or more buttons 552 as a command to order the dimmer switch 110A to perform the adjustment to 50%.

The controller may communicate the command to the dimmer switch 110A via one or more wireless signals sent via wireless communication module 530 and/or 532 (e.g. in a manner that is the same or similar to the functions described with respect to communication modules 530 and/or 532 as described with regard to FIG. 4A). The controller 514 of 500A may be configured to control one or more visual indicators 556 to provide the user with one or more feedback or status indications (e.g. at least for a period of time). For example, one indicator of the one or more indicators 556 may indicate (e.g. for some period of time) that one or more buttons 552 may have been activated by a user (e.g. as interpreted by the controller). Also by way of example, one indicator of the one or more indicators 556 may indicate (e.g. for a period of time) that the dimmer switch 110A has received the command from the controller 514 to perform an adjustment (e.g. as input by the user) of the lighting load 104A. Also by way of example, one indicator of the one or more indicators 556 may indicate that that battery 550 is at a low level of charge.

Figure 5B:
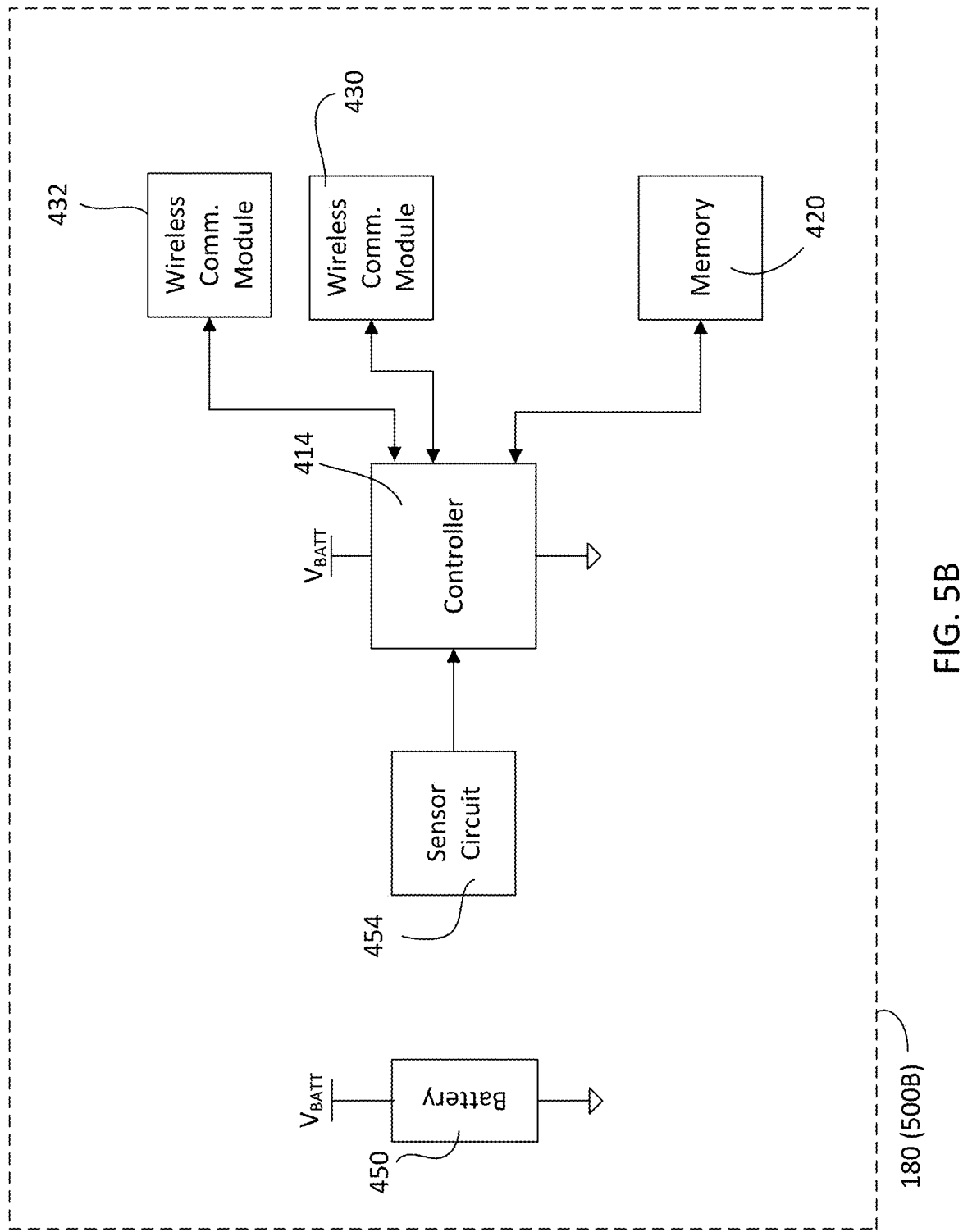
FIG. 5B is a simplified example block diagram of a sensor device like the occupancy sensor of FIGS. 3A and 3B.

FIG. 5B is a first simplified example block diagram 500B of a device like the occupancy sensor 180 of FIGS. 3A-3B. The occupancy sensor 180 (500B) may include one or more of the same or similar devices as those included and described with respect to the remote controller 184 (500A) of FIG. 5A. The one or more of the elements within these devices, one or more of the functions of these devices, and/or one or more of the interactions of and among these devices may be the same or similar as described with respect to FIG. 4A and FIG. 5A.

The occupancy sensor 180 (500B) may also include at least one sensor circuit 554. The at least one sensor circuit 554 may detect the presence (or lack thereof) of people in a given area of senor effectiveness. The controller 515 of 500B may be configured to receive a signal from the at least one sensor 554, interpret the signal as indicating a presence or absence of people in the given area of sensor effectiveness (perhaps for a period of time), and/or send one or more commands to other devices based on the interpreted presence of people or lack thereof. For example, should the controller 514 of 500B interpret the at least one sensor 554 to report the lack of presence in the given area of effectiveness (perhaps for some period of time, e.g. 60 seconds), the controller may send respective commands to one or more of the dimmer switches 110A, 110B, and/or 110C to lower the respective intensities of the lighting loads 104A, 104B, and/or 104C (e.g. shutoff all the lights when all people have left the room). Also by way of example, should the controller 514 of 500B interpret the at least one sensor 554 to report a transition from a lack of any presence to the presence of at least one person in the given area of effectiveness, the controller may send respective commands to one or more of the dimmer switches 110A, 110B, and/or 110C to increase the respective intensities of the lighting loads 104A, 104B, and/or 104C (e.g. turn at least some of the lights when at least one person enters the area of sensor effectiveness). The controller 514 of 500B may communicate the command to the dimmer switch 110A, dimmer switch 110B, and/or dimmer switch 110C via one or more wireless signals sent via wireless communication module 530 and/or 532 (e.g. in a manner that is the same or similar to the functions described with respect to communication modules 530 and/or 532 as described with regard to FIG. 4A).

Figure 5C:
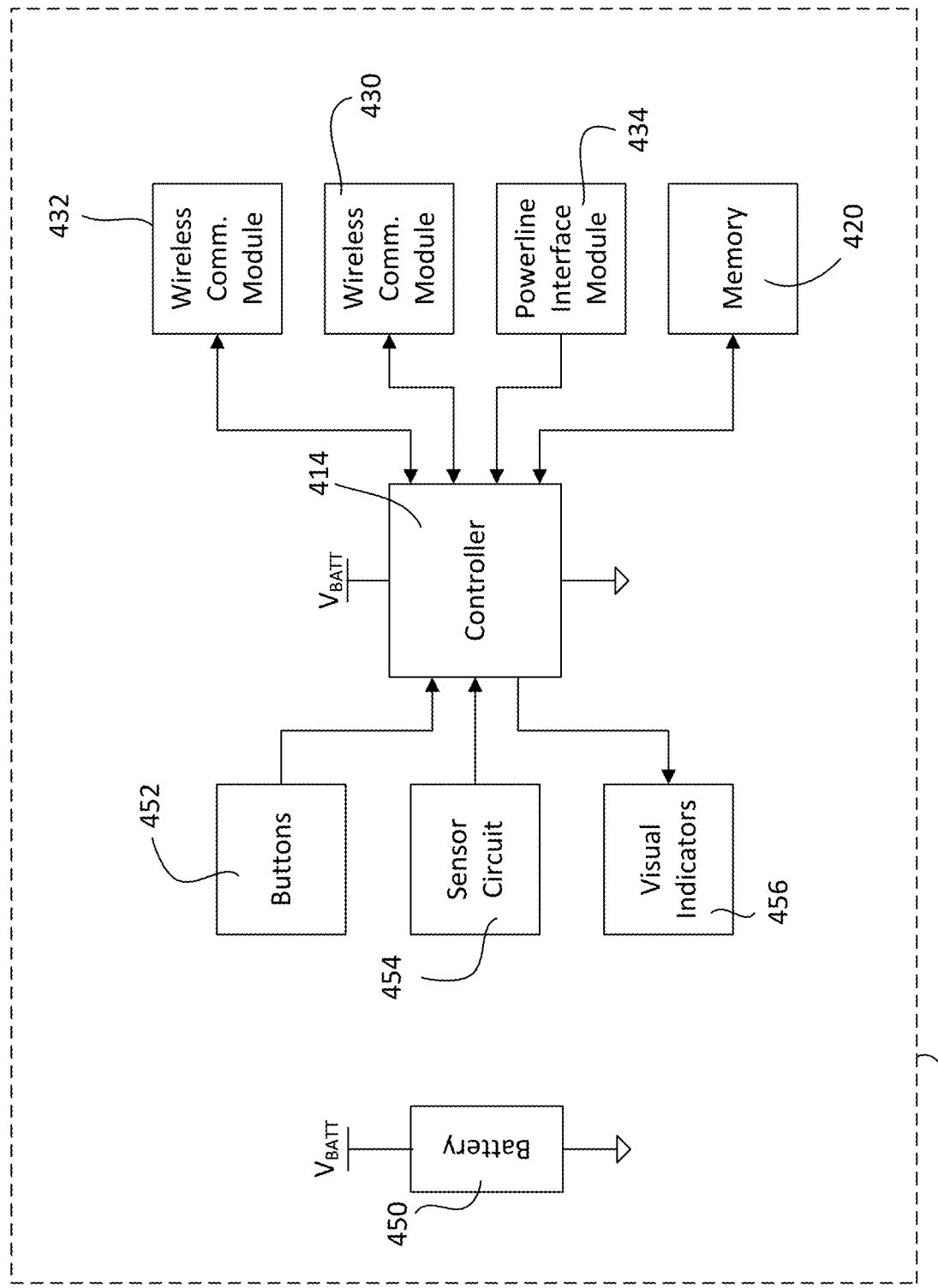
FIG. 5C is a simplified example block diagram of a contemplated combination input device and sensor device which may be employed in the environments of FIGS. 3A and 3B.

FIG. 5C is a simplified example block diagram 500C of a contemplated combination input device and sensor device which may be employed in the environments of FIGS. 3A-3B. The combination input/senor device of 500C may include one or more of the same or similar devices as those included and described with respect to the remote controller 184 (500A) and the occupancy sensor 180 (500B) that may be employed in the environments of FIGS. 3A-3B. The combination input/sensor device of 500C may further include a powerline interface module 534. The one or more of the elements within these devices, one or more of the functions of these devices, and/or one or more of the interactions of and among these devices may be the same or similar as described with respect to FIG. 4A, FIG. 5A, and FIG. 5B.

As described previously, any of the devices of the network environments 300A and 300B of FIGS. 3A-3B (e.g. wireless control device 120, dimmer switches 110A, 110B, and/or 110C, router 130, occupancy sensor 180, remote control 184, laptops 312 and/or 314, among others shown and not shown) for a number of contemplate purposes, may include one or more radios. For example, any of the devices of the network environments 300A and 300B may include at least one radio that may be operable to transmit via multiple protocols (e.g. the Wi-Fi and/or the Clear Connect™ protocols) over multiple communication networks, wired and/or wireless, which may be operable to communicate with the respective protocols. Alternatively or additionally, any of the devices of the network environments 300A and 300B may include at least one radio that may be operable to transmit/receive via at least one protocol (e.g. Wi-Fi) and at least a second radio that may be operable to transmit/receive via at least another protocol (e.g. a reliable RF protocol like Clear Connect™) over multiple communication networks, wired and/or wireless, that may be operable to communicate with the respective protocols.

One or more, or any, of the devices of the network environments 300A and 300B may serve as a master gateway node (e.g. may be elected by the other devices to serve as the master gateway node). The master gateway node may serve as a Dynamic Host Configuration Protocol (DHCP) node (or function), for example. The master gateway node may provide one or more, or any, of the other devices of the network environments 300A and 300B with information that may enable the one or more other devices to connect to the Wi-Fi network (e.g. an IP based protocol). By way of example, and not limitation, the master gateway node may provide the one or more devices of the network environments 300A and 300B with a service set identifier (SSID), an SSID password, a wireless security password or key value such as a WEP password/key or a WPA password/key, and/or an IP address, and/or other credentials or access information to enable the respective devices to connect (or register) to the Wi-Fi protocol network (e.g. via the router 130). Such Wi-Fi access information may be preconfigured on any of the respective devices of the network environments 300A and 300B.

The Wi-Fi access information may be provided to the one or more devices of the network environments 300A and 300B via a reliable broadcast-capable RF protocol, such as the previously described Clear Connect™ protocol, either approximately at a time that it may be useful for the one or more devices to join the Wi-Fi communication network, or at some time earlier. For example, the Wi-Fi access information (e.g. even if preconfigured) for the one or more devices may be updated by the master gateway node either periodically or under certain conditions. Also, the master gateway node may provide an indication (e.g. via Clear Connect™) to the one or more devices of the network environments 300A and 300B that may invite the one or more devices to use the Wi-Fi protocol access information to communicate, at least temporarily (e.g. for a firmware upgrade), with one or more devices of the network environments 300A and 300B (e.g. the master gateway node or any other device of the network environments 300A and 300B). For example, perhaps after the invited node may have completed the function for which it was invited to join the Wi-Fi network (e.g. a firmware upgrade is fully communicated and/or completed), the master gateway node may signal (e.g. via Wi-Fi and/or Clear Connect™) the invited node to discontinue Wi-Fi communication and/or to leave the Wi-Fi network. By requesting that the invited node discontinue Wi-Fi communication and/or to leave the Wi-Fi network, the burden on the router 130 and/or Wi-Fi communication may be minimized.

Alternatively or additionally, the invited node may be configured to discontinue Wi-Fi communication and/or to leave the Wi-Fi network after the completion of the function for which it was invited to communicate via Wi-Fi and/or after the end of a timeout period (e.g. the invited node may leave the Wi-Fi network on its own determination and without being requested to leave the Wi-Fi network).

Alternatively or additionally, the one or more devices of the network environments 300A and 300B may use the Wi-Fi access information to communicate with one or more other devices of the network environments 300A and 300B at a time and/or under a condition determined by the one or more devices of the network environments 300A and 300B that may be in possession of Wi-Fi access information. For example, dimmer switch 110A may use its respective Wi-Fi access information to join the Wi-Fi communication network to communicate its monitoring database information (to one or other devices of the network environments 300A and 300B) via the Wi-Fi protocol, perhaps because its monitoring database may have become full. After the dimmer switch 110A communicates its monitoring database, the dimmer switch 110A may discontinue communication via the Wi-Fi protocol until such time as the dimmer switch 110A may be invited to (or may decide itself to) communicate once again via the Wi-Fi protocol.

The Wi-Fi protocol may be useful via which to communicate high bandwidth data (e.g. configuration data such as firmware upgrades and/or data for relatively sophisticated user interfaces, programming data, and/or database data management) among Wi-Fi capable (IP capable) devices. A reliable broadcast-capable RF protocol, such as the previously described Clear Connect™ protocol may be useful via which to communicate relatively low bandwidth data and/or relatively high performance signaling information (e.g. operational data such as operational commands, operational (runtime) error codes, programming error codes, and/or timing synchronization signals, among other relatively high performance data). It may be useful to allocate high bandwidth data signaling (e.g. firmware upgrades, user interface data, and/or database information transfer) more to Wi-Fi protocol communication so that reliable broadcast-capable RF protocol communication, such as via the Clear Connect™ protocol, may be allocated for the relatively high performance data signaling (e.g. time synchronization signaling).

Radios using the Wi-Fi protocol may communicate at a frequency of 2.4 GHz. This frequency may be considered part of the industrial, scientific, and medical (ISM) radio band—which may fairly crowded, may be widely available, and may be generally considered to be an unlicensed band. Radios may communicate using the Wi-Fi protocol at a range of 120 to 300 feet (with 802.11n, up to double these ranges may be possible), for example. Radios may communicate using the Wi-Fi protocol at a rate of up to 54 Mbits/s (802.11g) and/or 300 Mbit/s (802.11n), with an average data rate of approximately 22 Mbit/s, for example. Radios may communicate via Wi-Fi with an output power of approximately 20-100 mW (13-20 dBm).

Radios using the Clear Connect™ protocol may communicate at frequencies of 434 MHz and/or 868 MHz (perhaps based on regional factors). The 434 MHz and 868 MHz bands may be far less crowded than other bands and may be licensed, and may be subject to a relatively stringent set of regulations, including the United States' Federal Communications Commission (FCC) regulations that may limit transmit power and/or duty cycle, for example. Radios may communicate using the Clear Connect™ protocol at a range of 30 to 60 feet indoor and/or 300 feet open air (perhaps extendable via repeaters), for example. Radios may communicate using the Clear Connect™ protocol at a rate of up to 62.5 Kbit/s, for example. Radios may communicate via Clear Connect™ with an output power of approximately 4 mW (5 dBm).

Referring once again to FIGS. 3A and 3B, FIGS. 3A and 3B illustrate exemplary environments 300A and 300B in which one or more coordination techniques may be implemented. In FIGS. 3A and 3B, dimmer switch 110A may be operatively connected to lighting load 104A, dimmer switch 110B may be operatively connected to lighting load 104B, and dimmer switch 110C may be operatively connected to lighting load 104C. Laptop 312 may be in use by a user may be in wireless communication with router 130 (e.g., for public Internet access). Router 130 may establish private IP addresses with the dimmer switches 110A, 110B, 110C, and/or the laptop 312, as described previously herein. A user may use the wireless control device 120 and/or the laptop 312 to control one or more of the dimmer switches 110A, 110B, and/or 110C. For example, the user may wish to turn off one or more of the lighting loads 104A, 104B, and/or 104C; or to turn on one or more of the lighting loads 104A, 104B, and/or 104C; or to put one or more of the respective lighting loads into respectively different dimmed and/or de-energized conditions (e.g., dim 104A to 75%, dim 104B to 50%, and turn off (or dim completely) 104C—among numerous other contemplated lighting load conditions). The user may wish (and may issue a corresponding command) that the lighting loads 104A, 104B, and/or 104C adjust to new dimming conditions at substantially the same time (e.g., within the scope of human perception).

For example, the user may not want to observe a noticeable delay between the dimming adjustments of lighting loads 104A, 104B, and/or 104C—instead the user may wish to perceive that the lighting loads 104A, 104B, 104C adjust to a freshly commanded dimming condition at the same time (e.g., as humans are capable of such perception). Humanly perceivable delays in any the respective dimming adjustments of lighting loads 104A, 104B, and/or 104C may be referred to as "the popcorn effect"—a term that may be used for illustration and explanation and not by way of limitation. One or more contemplated techniques may address the popcorn effect so that, when the user so commands, dimming adjustments commanded by the user of dimmer switch 110A, 110B, and/or 110C may be made at substantially the same time (e.g., synchronized such that a typical person may not perceive a time difference between the dimming effect of lighting load 104A, 104B, and/or 104C).

Figure 6:
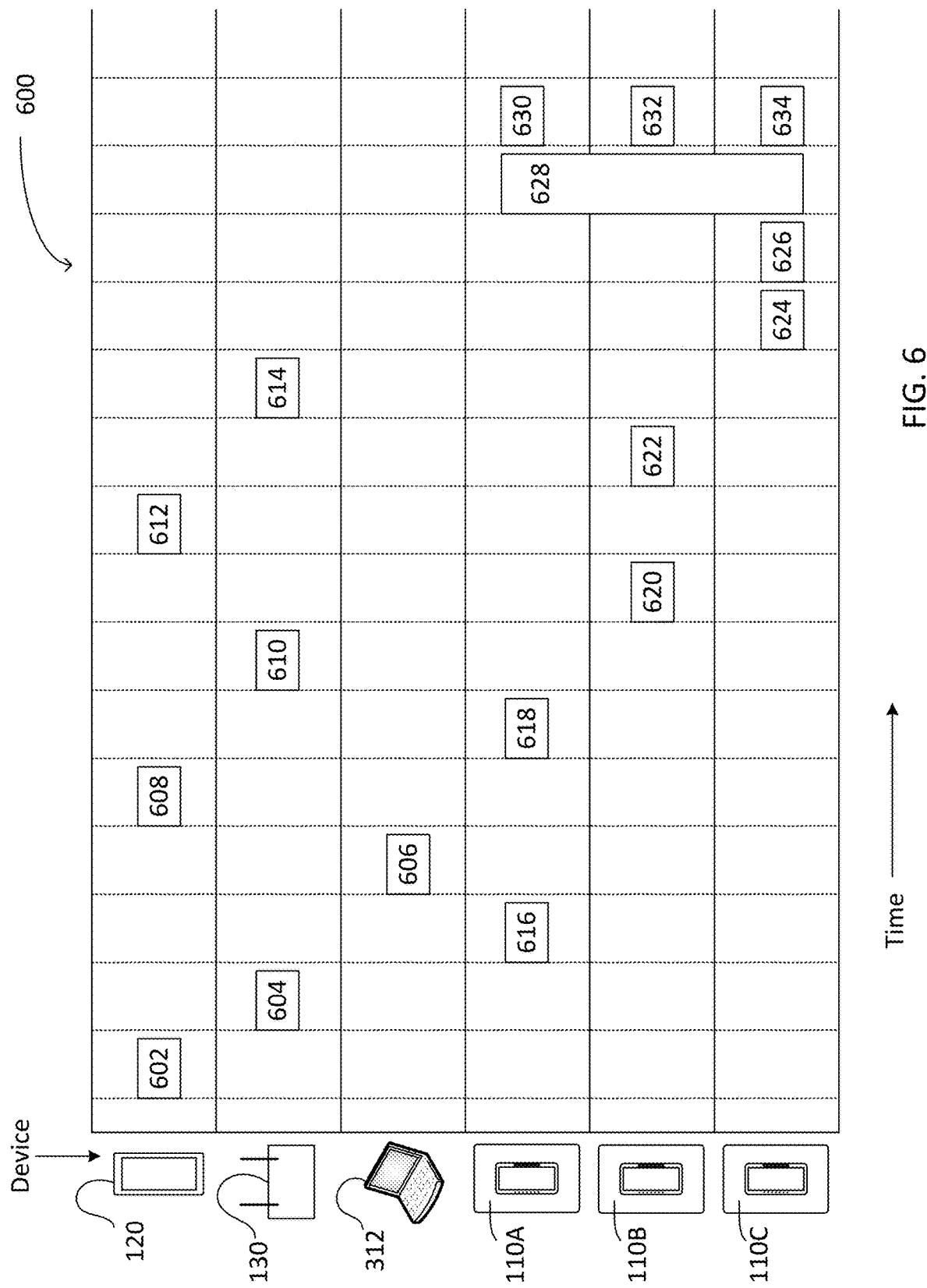
FIG. 6 is an example timing scheme for one or more contemplated load control device coordination techniques.

FIG. 6 depicts an exemplary timing scheme 600 (that may include any of the elements from the network environments 300A and 300B and shown or not shown)) that illustrates the popcorn effect that a user may experience in the previously described example (where in the example the user sends the command via the wireless control device 120 while the user is streaming music via laptop 312). Referring to FIG. 6, at 602 the wireless control device 120 may send a message (e.g., one or more IP packets) to command dimmer switch 110A to adjust the load that dimmer switch 110A controls (lighting load 104A). At 604, the router 130 may send a message (e.g., one or more IP packets) commanding the dimmer switch 110A to adjust the lighting load 104A. At 606, laptop 312 may send a message (e.g., one or more IP packets) requesting music from a public IP server to the router 130. At 608 the wireless control device 120 may send a message (e.g., one or more IP packets) to command dimmer switch 110B to adjust the load that dimmer switch 110B controls (lighting load 104B). At 610, the router 130 may send a message (e.g., one or more IP packets) commanding the dimmer switch 110B to adjust the lighting load 104B as well as sending one or more music IP packets to laptop 312. At 612, the wireless control device 120 may send a message (e.g., one or more IP packets) to command dimmer switch 110C to adjust the load that dimmer switch 110C controls (lighting load 104C). At 614, the router 130 may send a message (e.g., one or more IP packets) commanding the dimmer switch 110C to adjust the lighting load 104C as well as sending one or more additional music IP packets to laptop 312.

One or more techniques may minimize the popcorn effect that the user may observe. For example, at 616, dimmer switch 110A may detect the command from router 130. At 618, dimmer switch 110A may send an acknowledgement (ACK) of the command to the wireless control device 120. At 620, dimmer switch 110B may detect the command from router 130. At 622, dimmer switch 110B may send an acknowledgement (ACK) of the command to the wireless control device 120. At 624, dimmer switch 110C may detect the command from router 130. At 626, dimmer switch 110C may send an acknowledgement (ACK) of the command to the wireless control device 120. At 628, at substantially the same time, dimmer switch 110A, dimmer switch 110B, and/or dimmer switch 110C may receive a trigger signal or message (e.g., one or more IP packets recognized as a predetermined trigger by dimmer switch 110A, dimmer switch 110B, and/or dimmer switch 110C). Alternatively at 628, a trigger condition may be determined at substantially the same time at the dimmer switch 110A, dimmer switch 110B, and/or dimmer switch 110C based on information contained in the received commands. At 630, dimmer switch 110A may adjust lighting load 104A to 75% in response to the trigger. At 632, dimmer switch 110B may adjust lighting load 104B to 50% in response to the trigger. At 634, dimmer switch 110C may adjust lighting load 104C to 0% (or de-energize lighting load 104C) in response to the trigger. For example, the respective dimmer switch adjustments at 630, 632, and 634 may occur at substantially the same time (e.g., in a manner in which any differences in time are not perceptible by a typical person).

The messages from the wireless control device 120 at 602, 608, and/or 612, as well as the commands to the respective dimmer switches 110A, 110B, and/or 110C at 604, 610, and/or 614 may be sent using a reliable broadcast-capable RF protocol, such as the previously described proprietary Clear Connect™ protocol (where the one or more music IP packets at 610 and/or 614 may be sent via a Wi-Fi based message). The commands sent at 604, 610, and/or 614 may also include instructions to execute the adjustment when the trigger is detected or determined. In addition, the acknowledgements that may be sent at 618, 622, and/or 626 as well as the trigger at 628 may also be sent using a reliable broadcast-capable RF protocol, such as the previously described proprietary Clear Connect™ protocol. Wi-Fi based messages may be used for monitoring other message and/or firmware upgrades, among other tasks.

Alternatively or additionally, at least one of the dimmer switches 110A, 110B, and/or 110C may be elected as a "master" node by the other dimmer switches. For example, dimmer switches 110B and 110C may elect 110A as the master node (e.g. via a reliable broadcast-capable RF protocol or a power line protocol, and via respective communication networks operable to communicate via such protocols). As the master node, dimmer switch 110A may determine that the wireless control device 120 sent the commands at 604, 610, and/or 614 (e.g. to itself and to the devices that may have elected dimmer switch 110A as their master node) that may also include instructions to execute the adjustment when the trigger is detected (via its Wi-Fi radio for example). Alternatively or additionally, the wireless control device 120 may send a command for a particular lighting "scene", e.g. "reading level", "theater level", "mid-day level", among others. The respective commanded scene may involve preconfigured settings for one or more of the dimmer switches 110A, 110B, and/or 110C. As the master node, dimmer switch 110A may recognize the commanded scene and may further recognize that the commanded scene involves one or more of the devices that may have elected the dimmer switch 110A as their master node. For example, dimmer switch 110B and/or dimmer switch 110C may be configured to respond to commands (e.g. the trigger) sent from their elected master node, in this example dimmer switch 110A. The master node dimmer switch 110A may determine a trigger condition and/or timing.

The trigger at 628 may be sent from the master node 110A, for example, via a protocol such as Clear Connect™ (wired or wireless), for example. In such scenarios, the master node dimmer switch 110A may determine the trigger condition based at least in part on the acknowledgements from dimmer switches 110B and/or 110C sent at 622 and 626—which may be sent via the Ethernet based IP protocol (e.g., TCP/IP and/or "HomePlug") that may be carried via the conductors that deliver electrical energy from the AC power source 102 to the router 130 and dimmer switches, 110A, 110B, and/or 110C, and/or via the Clear Connect™ protocol (wired or wireless, via second radio for example).

Figure 7:
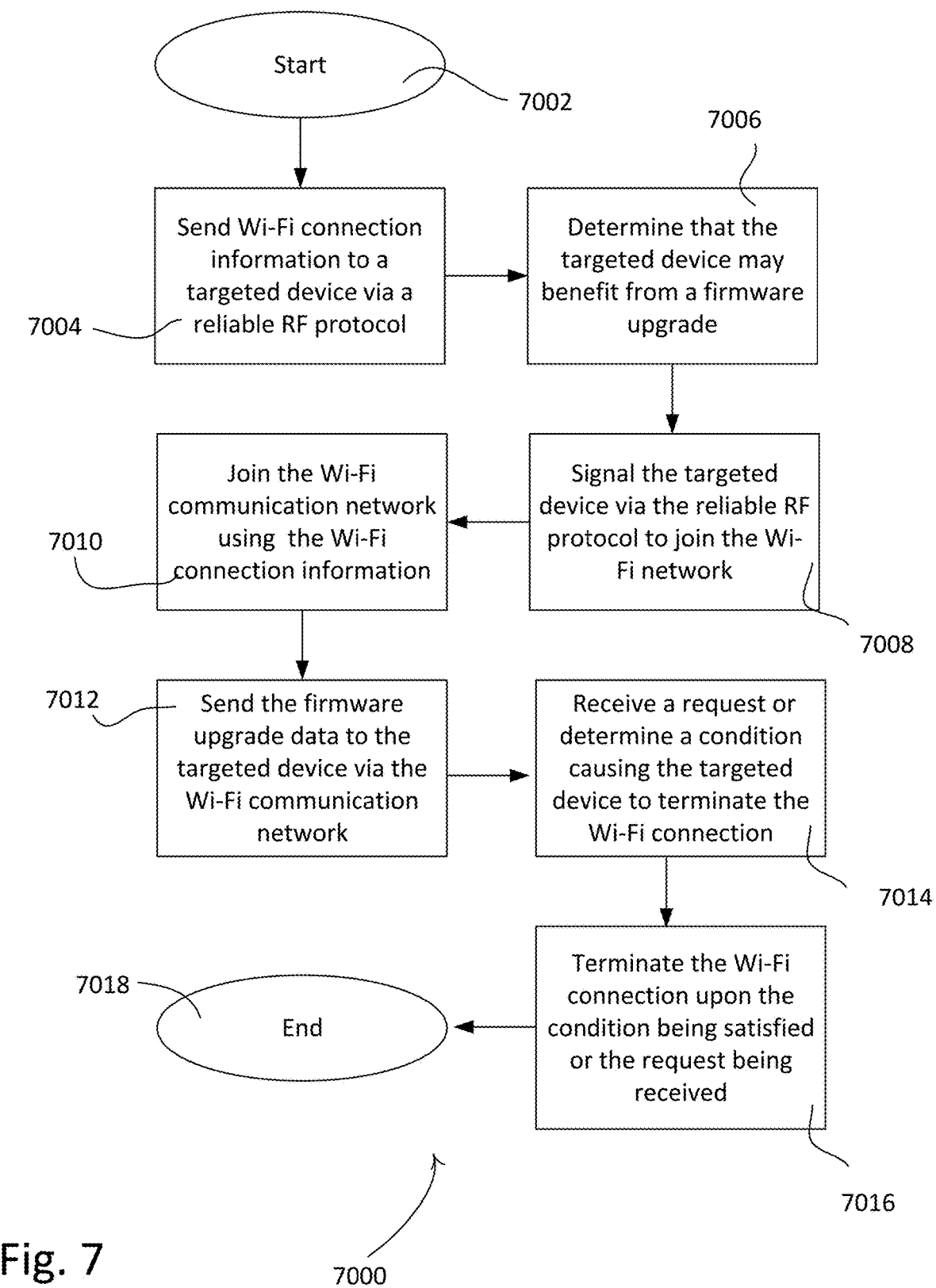
FIG. 7 is an example flow chart for Internet Protocol address assignments for load control devices.

Referring to FIG. 7, a technique 7000 may start at 7002 and may include, at 7004, sending Wi-Fi connection information (e.g. from the master gateway node) to a targeted device of a network environment (e.g. dimmer switch 110A or other load control device) via a reliable RF protocol (e.g. Clear Connect™). At 7006, another node in the network environment may decide to communicate a firmware upgrade to the targeted device. At 7008, the targeted node may be signaled (e.g. via the master gateway node) to use the Wi-Fi connection information to establish a Wi-Fi communication connection (e.g. with the router 130) via a reliable RF protocol (e.g. Clear Connect™).

At 7010, the targeted device may use the Wi-Fi connection information to establish itself on the Wi-Fi network and commence Wi-Fi communication (e.g. via the IP address provided by the master gateway node). At 7012, send the firmware upgrade data to the targeted device via the Wi-Fi communication network (e.g. the master gateway device and/or via the IP address of the targeted device). At 7014, upon the completion of the firmware upgrade data transfer and/or a successful firmware upgrade, the targeted device may receive a request (e.g. via the master gateway node) to terminate Wi-Fi communication and/or leave the Wi-Fi network. Alternatively or additionally, at 7014, upon the completion of the firmware upgrade data transfer and/or a successful firmware upgrade, the targeted device may determine a condition and/or period of time to terminate Wi-Fi communication and/or leave the Wi-Fi network. At 7016, the targeted device may terminate the Wi-Fi connection and/or leave the Wi-Fi network upon the condition being satisfied or the request being received. At 7018, the technique may end and may resume at 7002 as often as required to accommodate user configured load control functions for the network environment 300 and/or 500.

Figure 8:
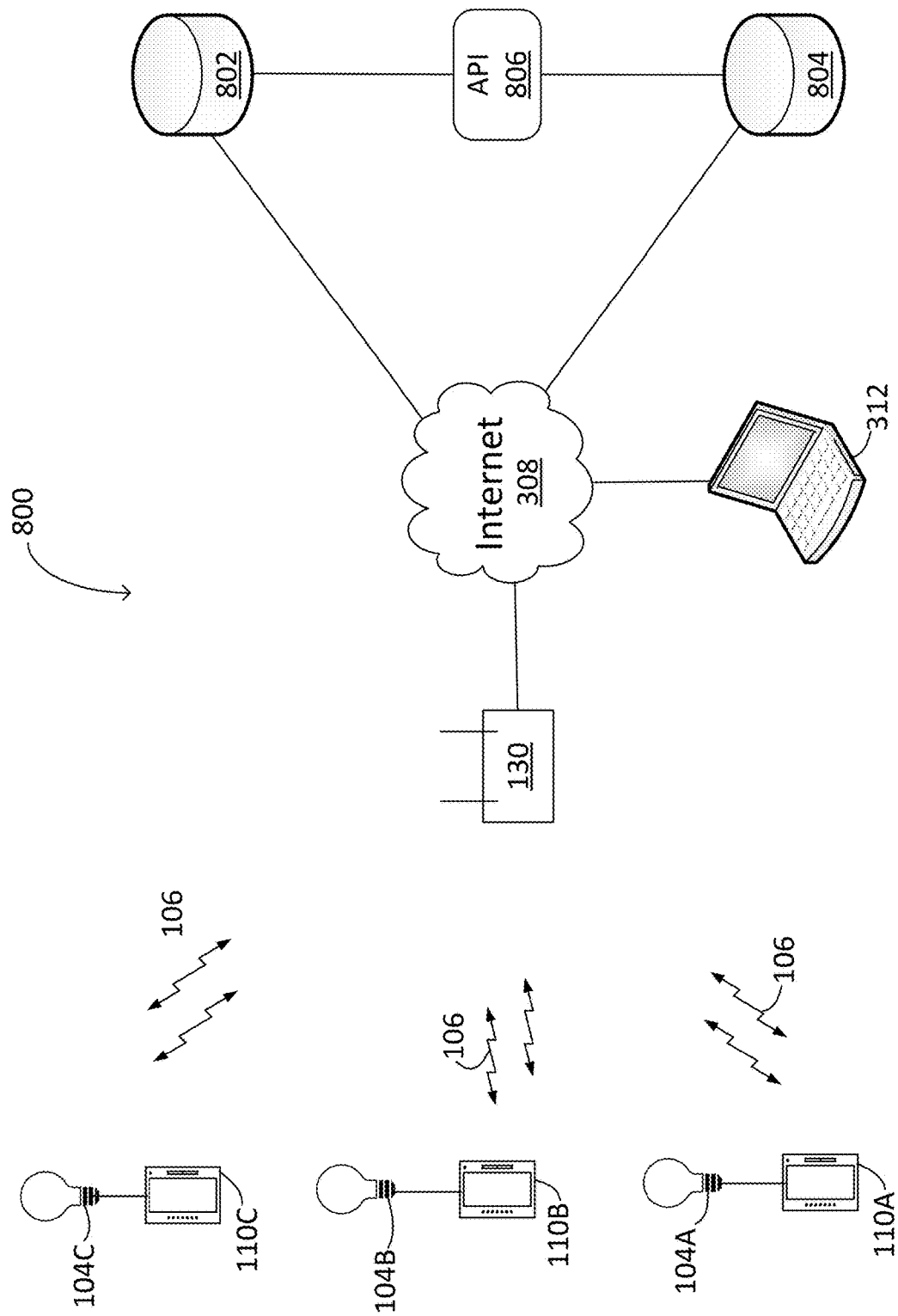
FIG. 8 is an example illustration used to describe various home automations that may be performed with one or more load control devices.

Referring to FIG. 8, a user may find it useful configure one or more of the devices that may have an IP address to perform various automation tasks that may be based, at least in part, on information obtained via the Internet 308. FIG. 8 illustrates an exemplary system environment 800 in which dimmer switches 110A, 110B, and/or 110C and lighting loads 104A, 104B, 104C may operate and/or be configured in a fashion similar to that described previously herein. Also, router 130 may communicate with the Internet 308 in a fashion similar to that described previously herein.

In FIG. 8, at least one of the dimmer switches 110A, 110B, or 110C (via the router 130) may function as a master (or leader) node and establish a persistent public IP address. For example, dimmer switch 110A acting as the master node may initiate a direct connection between itself, dimmer switch 110B, and/or dimmer switch 110C with a registration server 802. The direct connection may permit the dimmer switch 110A, 110B, and/or 110C to perform whatever function the API 806 may require of it (as configured by the user). The master node may not establish a direct connection between either dimmer switch 110B and/or dimmer switch 110C and instead may forward a message including the requested action required by the API 806 sent from the registration server 802 to dimmer switch 110B and/or dimmer switch 110C.

A user may use an application programming interface (API) 806, or the like, (perhaps operated via laptop 312) to access information from one or more application servers 804. API 806 may access information such as, but not limited to: electric utility demand and consumption information; a time-clock source for time and synchronization; weather data including current conditions and forecasts; Facebook profile data; Twitter profile data; firmware upgrade services; occupancy sensor data; light sensor data; news services; sports information services; email services; and/or data logging service. The user may configure (via API 806) one or more of the dimmer switches 110A, 110B, and/or 110C (and/or other lighting loads not shown) to perform certain behaviors or adjustments based at least in part on information obtained from one or more Internet sources, such as but not limited to application server 804 (and the like).

By way of example, and not limitation, the user could configure one or more of the dimmer switches 110A, 110B, and/or 110C to flash one or more of lighting loads 104A, 104B, and/or 104C when a user's Facebook profile indicates a new posting, new status or timeline comment, new photo tag, new friend request, new message, or some similar Facebook profile action or activity.

Also by way of example, and not limitation, the user could configure one or more of the dimmer switches 110A, 110B, and/or 110C (and/or outside or walkway lighting loads (not shown)), to adjust to a particular dimming intensity when the local weather forecast indicates overcast and/or rain. Likewise, the dimmer switches 110A, 110B, and/or 110C (and/or outside or walkway lighting loads) may be configured to adjust to a lower dimming intensity when the local weather forecast indicates clear or sunny skies.

Also by way of example, and not limitation, the user could configure one or more of dimmer switch 110A, dimmer switch 110B, and/or dimmer switch 110C to flash at a predetermined frequency and for a predetermined duration when a sports service reports that a designated sports team has scored some kind of point. For example, a user may wish to have such a lighting load indication when her alma matter's football team scores a touchdown or a field goal.

Although the examples of FIG. 8 have been described with respect to configurable actions on the part of dimmer switches 110A, 110B, and/or 110C, the contemplated techniques may be applied to actions that may be configurable on other load control devices. For example, actions responsive to the information obtained via the Internet may be configured for performance by a plug-in load control device (PID), a temperature control device, a contact-closure output (CCO) pack, a digital ballast controller, and/or a motorized window treatment, among other devices.

While the present application has been described with reference to the dimmer switches 110, occupancy sensor 180, remote control 184, and the wireless control devices 120, the concepts of the contemplated devices and techniques could be applied to any control devices that are operable to communicate with each other, such as, for example, dimming ballasts for driving gas-discharge lamps; light-emitting diode (LED) drivers for driving LED light sources; screw-in luminaires including integral dimmer circuits and incandescent or halogen lamps; screw-in luminaires including integral ballast circuits and compact fluorescent lamps; screw-in luminaires including integral LED drivers and LED light sources; electronic switches, controllable circuit breakers, or other switching devices for turning appliances on and off; plug-in load control devices, controllable electrical receptacles, or controllable power strips for each controlling one or more plug-in loads; motor control units for controlling motor loads, such as ceiling fans or exhaust fans; drive units for controlling motorized window treatments or projection screens; motorized interior or exterior shutters; thermostats for a heating and/or cooling systems; temperature control devices for controlling setpoint temperatures of HVAC systems; air conditioners; compressors; electric baseboard heater controllers; controllable dampers; humidity control units; dehumidifiers; water heaters; pool pumps; televisions; computer monitors; audio systems or amplifiers; generators; electric chargers, such as electric vehicle chargers; an alternative energy controllers; occupancy sensors, vacancy sensors, daylight sensors, temperature sensors, humidity sensors, security sensors, proximity sensors, keypads, battery-powered remote controls, key fobs, cell phones, smart phones, tablets, personal digital assistants, personal computers, timeclocks, audio-visual controls, safety devices, and central control transmitters.

Additionally, the contemplated devices and techniques described herein may be implemented as a set of computer-executable instructions stored on a computer-readable medium, such as a random-access or read-only memory for example. Such computer-executable instructions may be executed by a processor or microcontroller, such as a microprocessor, within the dimmer switch 110, occupancy sensor 180, remote control 184, or the wireless control device 120, for example.

What is claimed is:

1. A system for controlling power delivered to at least one electrical load, the system comprising:
    a load control device comprising a controllably conductive device configured to control power to at least one electrical load; and
    a wireless communication device configured to transmit, via a first wireless communication protocol of a first wireless communication network, configuration data to the load control device; and
    wherein the load control device is further configured to:
        receive the configuration data via the first wireless communication protocol of the first wireless communication network from the wireless communication device;
        configure the load control device according to the configuration data;
        subsequently receive control instructions via a second wireless communication protocol of a second wireless communication network, wherein the second wireless communication protocol is different than the first wireless communication protocol, and wherein the control instructions are configured to control the at least one electrical load; and
        control the at least one electrical load via the controllably conductive device based on the control instructions received via the second wireless communication protocol and the configuration of the load control device according to the configuration data received via the first wireless communication protocol.

2. The system of claim 1, wherein the configuration data represents high bandwidth data and is at least one of firmware upgrade data for the load control device, programming data for the load control device, user-interface data from the load control device, and database data from the load control device.

3. The system of claim 2, wherein the second wireless communication protocol comprises a wireless Internet Protocol (IP) based protocol, and wherein the load control device is configured to receive the control instructions via the wireless IP based protocol.

4. The system of claim 3, wherein the wireless IP based protocol is a Wi-Fi protocol.

5. The system of claim 1, wherein the control instructions represent low bandwidth data.

6. The system of claim 5, wherein the first wireless communication protocol comprises a proprietary protocol, and wherein the wireless communication device is configured to transmit the configuration data via the first wireless communication network using the proprietary protocol.

7. The system of claim 1, wherein the load control device is a dimmer switch.

8. The system of claim 7, wherein the at least one electrical load is a lighting load.

9. The system of claim 7, wherein the dimmer switch is a wall-mounted dimmer.

10. A load control device comprising:
    a controllably conductive device configured to control power to at least one electrical load;
    at least one wireless communication module configured to communicate on a first wireless communication network via a first wireless communication protocol and a second wireless communication network via a second wireless communication protocol; and
    a controller configured to:
        receive, via the at least one wireless communication module using the first wireless communication protocol of the first wireless communication network, configuration data from a wireless communication device;
        configure the load control device according to the configuration data;
        receive, via the at least one wireless communication module using the second wireless communication protocol of the second wireless communication network, control instructions configured to control the at least one electrical load via the controllably conductive device; and
        control the at least one electrical load via the controllably conductive device based on the control instructions received via the second wireless communication protocol and the configuration of the load control device according to the configuration data received via the first wireless communication protocol.

11. The load control device of claim 10, wherein the configuration data represents high bandwidth data and is at least one of firmware upgrade data for the load control device, programming data for the load control device, user-interface data from the load control device, and database data from the load control device.

12. The load control device of claim 11, wherein the second wireless communication protocol comprises a wireless Internet Protocol (IP) based protocol, and wherein the at least one communication module is configured to receive the control instructions via the wireless Internet IP based protocol.

13. The load control device of claim 12, wherein the wireless IP based protocol is a Wi-Fi protocol.

14. The load control device of claim 10, wherein the control instructions represent low bandwidth data.

15. The load control device of claim 14, wherein the first wireless communication protocol comprises a proprietary protocol, and wherein the at least one communication module is configured to receive the configuration data via the first wireless communication network using the proprietary protocol.

16. The load control device of claim 10, wherein the load control device is a dimmer switch.

17. The load control device of claim 16, wherein the at least one electrical load is a lighting load.

18. The load control device of claim 16, wherein the dimmer switch is a wall-mounted dimmer.

19. A method to configure, using a wireless communication device, an electrical load control device that includes a controllably conductive device coupled to a control circuit, the method comprising:
    receiving, by the control circuit from a wireless communication device, configuration data via a first wireless communication network using a first wireless communication protocol;
    configuring, by the control circuit, the electrical load control device according to the configuration data;
    receiving, by the control circuit subsequent to the receipt of the configuration data, control instructions via a second wireless communication network using a second wireless communication protocol different than the first wireless communication protocol, the control instructions to control the at least one electrical load; and controlling, by the control circuit, the at least one electrical load using the controllably conductive device based on the control instructions received via the second wireless communication network using the second wireless network communication protocol and the configuration of the electrical load control device according to the configuration data received via the first wireless communication network using the first wireless network communication protocol.

\* \* \* \* \*